(12) United States Patent
Herman et al.

(10) Patent No.: US 9,081,731 B2
(45) Date of Patent: Jul. 14, 2015

(54) EFFICIENT TRANSFORMS AND EFFICIENT ROW GENERATION FOR KRONECKER PRODUCTS OF HADAMARD MATRICES

(71) Applicant: InView Technology Corporation, Austin, TX (US)

(72) Inventors: Matthew A. Herman, Austin, TX (US); Tyler H. Weston, Austin, TX (US)

(73) Assignee: InView Technology Corporation, Austin, TX (US)

( * ) Notice: Subject to any disclaimer, the term of this patent is extended or adjusted under 35 U.S.C. 154(b) by 0 days.

(21) Appl. No.: 14/169,903

(22) Filed: Jan. 31, 2014

(65) Prior Publication Data

US 2014/0211039 A1    Jul. 31, 2014

Related U.S. Application Data

(60) Provisional application No. 61/762,600, filed on Feb. 8, 2013, provisional application No. 61/759,003, filed on Jan. 31, 2013.

(51) Int. Cl.
*H04N 19/112* (2014.01)
*G06F 17/14* (2006.01)
*G06T 9/00* (2006.01)
*G06T 1/00* (2006.01)
*H04N 5/232* (2006.01)

(52) U.S. Cl.
CPC ............ *G06F 17/145* (2013.01); *G06T 1/0007* (2013.01); *G06T 9/00* (2013.01); *H04N 5/23229* (2013.01)

(58) Field of Classification Search
CPC ............................. H04N 19/112; G06F 17/145
USPC ................... 348/222.1, 239, 281; 382/240
See application file for complete search history.

(56) References Cited

U.S. PATENT DOCUMENTS 8,570,405 B2    10/2013 Kelly et al.
2004/0190610 A1*   9/2004 Song et al. ............... 375/240.03

OTHER PUBLICATIONS

Wikipedia; "Kronecker Product"; http://en.wikipedia.org/wiki/Kronecker_product; last modified Jan. 27, 2014; seven pages.
Wikipedia; "Fast Walsh-Hadamand Transform"; http://en.wikipedia.org/wiki/Fast_Walsh%E2%80%93Hadamard_transform; last modified Apr. 2013; two pages.

* cited by examiner

*Primary Examiner* — Joel Fosselman
(74) *Attorney, Agent, or Firm* — Meyertons Hood Kivlin Kowert & Goetzel, P.C.; Jeffrey C. Hood; Mark K. Brightwell

(57) ABSTRACT

If a Hadamard matrix $H_N$ of order $N=BF$ is a Kronecker product $H_F \otimes H_B$ of an order F Hadamard matrix and an order B Hadamard matrix, then transformation by $H_N$ may be implemented by a fast Hadamard transform at coarse scale followed by fast Hadamard transforms at fine scale. Alternatively, transformation by $H_N$ may be achieved by performing order B transforms on columns of a two-dimensional array and order B transforms on rows of the array. As another alternative, transformation by $H_N$ may be achieved by computing intermediate values based on linear combinations of input elements and then computing linear combinations of the intermediate values. For compressive signal acquisition, any row of $H_N$ may be generated by concatenating selectively modified copies of a corresponding row of $H_B$. Thus, modulation patterns may be generated on the fly.

20 Claims, 17 Drawing Sheets $$H_{12} = \begin{bmatrix} +1 & +1 & +1 & +1 & +1 & +1 & +1 & +1 & +1 & +1 & +1 & +1 \\ +1 & -1 & -1 & +1 & -1 & -1 & -1 & +1 & +1 & +1 & -1 & +1 \\ +1 & +1 & -1 & -1 & +1 & -1 & -1 & -1 & +1 & +1 & +1 & -1 \\ +1 & -1 & +1 & -1 & -1 & +1 & -1 & -1 & -1 & +1 & +1 & +1 \\ +1 & +1 & -1 & +1 & -1 & -1 & +1 & -1 & -1 & -1 & +1 & +1 \\ +1 & +1 & +1 & -1 & +1 & -1 & -1 & +1 & -1 & -1 & -1 & +1 \\ +1 & +1 & +1 & +1 & -1 & +1 & -1 & -1 & +1 & -1 & -1 & -1 \\ +1 & -1 & +1 & +1 & +1 & -1 & +1 & -1 & -1 & +1 & -1 & -1 \\ +1 & -1 & -1 & +1 & +1 & +1 & -1 & +1 & -1 & -1 & +1 & -1 \\ +1 & -1 & -1 & -1 & +1 & +1 & +1 & -1 & +1 & -1 & -1 & +1 \\ +1 & +1 & -1 & -1 & -1 & +1 & +1 & +1 & -1 & +1 & -1 & -1 \\ +1 & -1 & +1 & -1 & -1 & -1 & +1 & +1 & +1 & -1 & +1 & -1 \end{bmatrix} \quad (Eq.\ 8)$$

1100 receive compressive sensing measurements of an image 1105 execute a reconstruction algorithm on the compressive sensing measurements, wherein said executing the reconstruction algorithm includes computing successive estimates of the image using the compressive sensing measurements, and, for each of the successive image estimates, computing an efficient a Hadamard transform $H_{BF}$ of the form $H_{BF}=H_F \otimes H_B$ on the image estimate, wherein $H_F$ is a Hadamard transform of size FxF, wherein $H_B$ is a Hadamard transform of size BxB, wherein B is not a power of two, wherein said computing the Hadamard transform $H_{BF}$ on the image estimate is performed by: 1107 performing a fast Hadamard transform of size F on a vector x representing the image estimate, to obtain an intermediate vector w, wherein the vector x is of size N=FB, wherein the fast Hadamard transform is based on the FxF matrix $H_F$, wherein the fast Hadamard transform operates on a partitioning of the vector x into F subvectors of size B, wherein the F subvectors are treated as the F atomic inputs to the fast Hadamard transform 1110 generating an output vector z by performing the Hadamard transform $H_B$ on each of F subvectors of the intermediate vector w to obtain corresponding subvectors of a resultant vector, wherein the output vector z represents the Hadamard transform $H_{BF}$ of the image estimate 1115

```
store a vector x of size FB into memory so that is organized as a
two-dimensional array having B rows and F columns      1210
```

```
perform a Hadamard transform of size B on each of the F columns
1215
```

```
perform a fast Hadamard transform of size F on each of the B rows.
 1220
```

FIG. 12

1300 receive a vector x having N components 1310 partition the N components of the vector x into M distinct subsets of components 1315 compute intermediate values, wherein the intermediate values comprise M distinct groups of intermediate values, wherein the intermediate values in each group are determined by computing linear combinations of the components in a respective one of the M distinct subsets, wherein coefficients of the linear combinations are from the set {1,-1} 1320 compute N resultant values, wherein each of the N resultant values is computed as a corresponding linear combination of a corresponding subset of the intermediate values, wherein coefficients of the linear combinations are from the set {1,-1}, wherein the resultant values represent the Hadamard transform of the vector x 1325

FIG. 13

1350 receive compressive sensing measurements of an image  1355 execute a reconstruction algorithm on the compressive sensing measurements, wherein said executing the reconstruction algorithm includes computing successive estimates of the image using the compressive sensing measurements, and, for each of the successive image estimates, computing an NxN Hadamard transform on the image estimate, wherein N is not a power of two, wherein said computing the NxN Hadamard transform on the image estimate includes:  1360 partition the N components of a vector x representing the image estimate into M distinct subsets of components  1365 compute intermediate values, wherein the intermediate values comprise M distinct groups of intermediate values, wherein the intermediate values in each group are determined by computing linear combinations of the components in a respective one of the M distinct subsets, wherein coefficients of the linear combinations are from the set {1,-1}  1370 compute N resultant values, wherein each of the N resultant values is computed as a corresponding linear combination of a corresponding subset of the intermediate values, wherein coefficients of the linear combinations are from the set {1,-1}, wherein the resultant values represent the Hadamard transform of the image estimate  1375

```
randomly or pseudo-randomly generate an index $m_i$ in the range {0, 1, 2, …, N-1}, wherein the index $m_i$ identifies a row of an NxN matrix Z having the form of a Kronecker product between a matrix X and a matrix Y, wherein X is an FxF matrix, where Y is a BxB matrix, wherein N=BF, wherein B and F are integers greater than one  1410
```

↓

```
operate on the index $m_i$ to obtain an index k and an index l, wherein index k identifies a row of the matrix Y, wherein the index l identifies a row of the matrix X   1415
```

↓ generate the $k^{th}$ row of the matrix Y   1420

↓

```
generate selectively-modified copies of the $k^{th}$ row of the matrix Y, wherein the selective modification of copies is controlled by respective elements in the $l^{th}$ row of the matrix X   1430
```

↓

```
supply the selectively-modified copies to an array of signal modulating elements to enable the array to modulate the signal based on the $m_i^{th}$ row of the matrix Z   1435
```

↓ repeat 1410 through 1435 a plurality of times   1440

FIG. 14

EFFICIENT TRANSFORMS AND EFFICIENT ROW GENERATION FOR KRONECKER PRODUCTS OF HADAMARD MATRICES

PRIORITY CLAIM DATA

This application claims the benefit of priority to: (a) U.S. Provisional Application No. 61/762,600, filed on Feb. 8, 2013, entitled "Efficient Generation of Signal Sensing-Matrix Vectors and Efficient Transform for Signal Reconstruction"; and (b) U.S. Provisional Application No. 61/759,003, filed on Jan. 31, 2013, entitled "Harmonically Related Rows of Kronecker-Product Matrices". Those applications are hereby incorporated by reference in their entireties as though fully and completely set forth herein.

FIELD OF THE INVENTION

The present invention relates to the field of compressive sensing, and more particularly, to mechanisms for performing fast transforms based on Kronecker products of Hadamard matrices, and mechanisms for efficiently generating rows of Kronecker products of Hadamard matrices.

BACKGROUND

According to Nyquist theory, a signal x(t) whose signal energy is supported on the frequency interval [−B,B] may be reconstructed from samples {x(nT)} of the signal x(t), provided the rate $f_S=1/T_S$ at which the samples are captured is sufficiently high, i.e., provided that $f_S$ is greater than 2B. Similarly, for a signal whose signal energy is supported on the frequency interval [A,B], the signal may be reconstructed from samples captured with sample rate greater than B−A. A fundamental problem with any attempt to capture a signal x(t) according to Nyquist theory is the large number of samples that are generated, especially when B (or B−A) is large. The large number of samples is taxing on memory resources and on the capacity of transmission channels.

Nyquist theory is not limited to functions of time. Indeed, Nyquist theory applies more generally to any function of one or more real variables. For example, Nyquist theory applies to functions of two spatial variables such as images, to functions of time and two spatial variables such as video, and to the functions used in multispectral imaging, hyperspectral imaging, medical imaging and a wide variety of other applications. In the case of an image I(x,y) that depends on spatial variables x and y, the image may be reconstructed from samples of the image, provided the samples are captured with sufficiently high spatial density. For example, given samples {I(nΔx, mΔy)} captured along a rectangular grid, the horizontal and vertical densities 1/Δx and 1/Δy should be respectively greater than $2B_x$ and $2B_y$, where $B_x$ and $B_y$ are the highest x and y spatial frequencies occurring in the image I(x,y). The same problem of overwhelming data volume is experienced when attempting to capture an image according to Nyquist theory. The modern theory of compressive sensing is directed to such problems.

Compressive sensing relies on the observation that many signals (e.g., images or video sequences) of practical interest are not only band-limited but also sparse or approximately sparse when represented using an appropriate choice of transformation, for example, a transformation such as a Fourier transform, a wavelet transform or a discrete cosine transform (DCT). A signal vector v is said to be K-sparse with respect to a given transformation T when the transformation of the signal vector, Tv, has no more than K non-zero coefficients. A signal vector v is said to be sparse with respect to a given transformation T when it is K-sparse with respect to that transformation for some integer K much smaller than the number L of components in the transformation vector Tv.

A signal vector v is said to be approximately K-sparse with respect to a given transformation T when the coefficients of the transformation vector, Tv, are dominated by the K largest coefficients (i.e., largest in the sense of magnitude or absolute value). In other words, if the K largest coefficients account for a high percentage of the energy in the entire set of coefficients, then the signal vector v is approximately K-sparse with respect to transformation T. A signal vector v is said to be approximately sparse with respect to a given transformation T when it is approximately K-sparse with respect to the transformation T for some integer K much less than the number L of components in the transformation vector Tv.

Given a sensing device that captures images with N samples per image and in conformity to the Nyquist condition on spatial rates, it is often the case that there exists some transformation and some integer K very much smaller than N such that the transform of each captured image will be approximately K sparse. The set of K dominant coefficients may vary from one image to the next. Furthermore, the value of K and the selection of the transformation may vary from one context (e.g., imaging application) to the next. Examples of typical transforms that might work in different contexts include the Fourier transform, the wavelet transform, the DCT, the Gabor transform, etc.

Compressive sensing specifies a way of operating on the N samples of an image so as to generate a much smaller set of samples from which the N samples may be reconstructed, given knowledge of the transform under which the image is sparse (or approximately sparse). In particular, compressive sensing invites one to think of the N samples as a vector v in an N-dimensional space and to imagine projecting the vector v onto each vector in a series of M vectors {R(i): i=1, 2, ..., M} in the N-dimensional space, where M is larger than K but still much smaller than N. Each projection gives a corresponding real number S(i), e.g., according to the expression $$S(i)=<v,R(i)>,$$

where the notation <v,R(i)> represents the inner product (or dot product) of the vector v and the vector R(i). Thus, the series of M projections gives a vector U including M real numbers: $U_i=S(i)$. Compressive sensing theory further prescribes methods for reconstructing (or estimating) the vector v of N samples from the vector U of M real numbers and the series of measurement vectors {R(i): i=1, 2, ..., M}. For example, according to one method, one should determine the vector x that has the smallest length (in the sense of the $L_1$ norm) subject to the condition that ΦTx=U, where Φ is a matrix whose rows are the transposes of the vectors R(i), where T is the transformation under which the image is K sparse or approximately K sparse.

Compressive sensing is important because, among other reasons, it allows reconstruction of an image based on M measurements instead of the much larger number of measurements N recommended by Nyquist theory. Thus, for example, a compressive sensing camera would be able to capture a significantly larger number of images for a given size of image store, and/or, transmit a significantly larger number of images per unit time through a communication channel of given capacity.

As mentioned above, compressive sensing operates by projecting the image vector v onto a series of M vectors. As discussed in U.S. Pat. No. 8,199,244, issued Jun. 12, 2012

(invented by Baraniuk et al.) and illustrated in FIG. 1, an imaging device (e.g., camera) may be configured to take advantage of the compressive-sensing paradigm by using a digital micromirror device (DMD) 40. An incident lightfield 10 passes through a lens 20 and then interacts with the DMD 40. The DMD includes a two-dimensional array of micromirrors, each of which is configured to independently and controllably switch between two orientation states. Each micromirror reflects a corresponding portion of the incident light field based on its instantaneous orientation. Any micromirrors in a first of the two orientation states will reflect their corresponding light portions so that they pass through lens 50. Any micromirrors in a second of the two orientation states will reflect their corresponding light portions away from lens 50. Lens 50 serves to concentrate the light portions from micromirrors in the first orientation state onto a photodiode (or photodetector) situated at location 60. Thus, the photodiode generates a signal whose amplitude at any given time represents a sum of the intensities of the light portions from the micromirrors in the first orientation state.

The compressive sensing is implemented by driving the orientations of the micromirrors through a series of spatial patterns. Each spatial pattern specifies an orientation state for each of the micromirrors. The output signal of the photodiode is digitized by an A/D converter 70. In this fashion, the imaging device is able to capture a series of measurements {S(i)} that represent inner products (dot products) between the incident light field and the series of spatial patterns without first acquiring the incident light field as a pixelized digital image. The incident light field corresponds to the vector v of the discussion above, and the spatial patterns correspond to the vectors R(i) of the discussion above.

The incident light field may be modeled by a function I(x,y,t) of two spatial variables and time. Assuming for the sake of discussion that the DMD comprises a rectangular array, the DMD implements a spatial modulation of the incident light field so that the light field leaving the DMD in the direction of the lens 50 might be modeled by $$\{I(n\Delta x, m\Delta y, t) * M(n,m,t)\}$$

where m and n are integer indices, where $I(n\Delta x, m\Delta y, t)$ represents the portion of the light field that is incident upon that $(n,m)^{th}$ mirror of the DMD at time t. The function $M(n,m,t)$ represents the orientation of the $(n,m)^{th}$ mirror of the DMD at time t. At sampling times, the function $M(n,m,t)$ equals one or zero, depending on the state of the digital control signal that controls the $(n,m)^{th}$ mirror. The condition $M(n,m,t)=1$ corresponds to the orientation state that reflects onto the path that leads to the lens 50. The condition $M(n,m,t)=0$ corresponds to the orientation state that reflects away from the lens 50.

The lens 50 concentrates the spatially-modulated light field $$\{I(n\Delta x, m\Delta y, t) * M(n,m,t)\}$$

onto a light sensitive surface of the photodiode. Thus, the lens and the photodiode together implement a spatial summation of the light portions in the spatially-modulated light field:

$$S(t) = \sum_{n,m} I(n\Delta x, m\Delta y, t) M(n,m,t).$$

Signal S(t) may be interpreted as the intensity at time t of the concentrated spot of light impinging upon the light sensing surface of the photodiode. The A/D converter captures measurements of S(t). In this fashion, the compressive sensing camera optically computes an inner product of the incident light field with each spatial pattern imposed on the mirrors. The multiplication portion of the inner product is implemented by the mirrors of the DMD. The summation portion of the inner product is implemented by the concentrating action of the lens and also the integrating action of the photodiode.

The image carried in the incident light field may be reconstructed by executing any of wide variety of reconstruction algorithms on the intensity measurements of the signal S(t). One common feature of many reconstruction algorithms is that they generate successive estimates of the image, and for each of the image estimates, compute the transform $\Phi$ on the image estimate, i.e., the transform specified by the sensing matrix $\Phi$. Thus, to improve the efficiency of the reconstruction algorithms, improved mechanisms are needed for computing transforms based on the sensing matrices useful in compressive sensing.

In the context of compressive sensing, it is generally desirable for the spatial patterns applied by the DMD to be incoherent with respect to the sparsity basis (i.e., the basis in which the image is sparse). One basic way to achieve incoherence is to generate rows of a structured matrix $M_{ST}$ (such as a Hadamard transform or discrete Fourier transform) and then apply a randomizing permutation $P_{Rand}$ of fine resolution to each of the generated rows. Thus, the spatial patterns are effectively drawn from rows of the product matrix $M_{ST}P_{Rand}$. However, such random permutations may be expense to implement in hardware, especially when the number of the size of the image (the number of columns in the matrix $M_{ST}$ is large). Thus, to improve the efficiency of compressive sensing, improved mechanisms for randomizing the spatial patterns applied by the DMD (or other signal modulating device) are needed.

Furthermore, because the objects being imaged by the compressive sensing camera may be moving and/or lighting conditions may be dynamic, it may be necessary for the DMD to apply the sequence of spatial patterns to the incident light field over a short period of time, to effectively capture a snapshot of the incident lightfield. Thus, mechanisms for efficiently generating rows of the sensing matrix $\Phi$ are needed. Furthermore, the sensing matrix $\Phi$ should have a structure that admits fast generation of rows.

SUMMARY

In one set of embodiments, a method for reconstructing an image based on compressive sensing measurements of the image may include the following operations.

The method may include receiving the compressive sensing measurements of the image, e.g., from a compressive sensing device such as a compressive sensing camera.

The method may also include executing a reconstruction algorithm on the compressive sensing measurements, wherein said executing the reconstruction algorithm includes computing successive estimates of the image using the compressive sensing measurements, and, for each of the successive image estimates, computing a Hadamard transform $H_{BF}$ of the form $H_{BF}=H_F \otimes H_B$ on the image estimate, wherein $\otimes$ denotes the Kronecker product, wherein $H_F$ is a Hadamard transform of size F×F, wherein $H_B$ is a Hadamard transform of size B×B, wherein B is not a power of two.

The action of computing the Hadamard transform $H_{BF}$ on the image estimate may be performed by: (a) performing a fast Hadamard transform of size F on a vector x representing the image estimate, to obtain an intermediate vector w, wherein the vector x is of size N=FB, wherein the fast Hadamard transform is based on the F×F matrix $H_F$, wherein the fast Hadamard transform operates on a partitioning of the vector x into F subvectors of size B, wherein the F subvectors are treated as the F atomic inputs to the fast Hadamard transform; and (b) generating an output vector z by performing the Hadamard transform $H_B$ on each of F subvectors of the intermediate vector w to obtain corresponding subvectors of a resultant vector, wherein the output vector z represents the Hadamard transform $H_{BF}$ of the image estimate.

In one set of embodiments, a method for computing a Hadamard transform $H_{BF}$ of the form $H_{BF}=H_F \otimes H_B$ may include the following operations. ($H_F$ is a Hadamard transform of size F×F, $H_B$ is a Hadamard transform of size B×B, F is a power of two, and B is not a power of two.)

The method may include storing a vector x of size FB into memory so that is organized as a two-dimensional array having B rows and F columns.

The method may also include performing a Hadamard transform of size B on each of the F columns of the two-dimensional array, wherein the Hadamard transform of size B on each column is performed as an in-place computation.

The method may also include performing a fast Hadamard transform of size F on each of the B rows of the two-dimensional array, wherein the fast Hadamard transform of size F on each row is performed as an in-place computation.

In one set of embodiments, a method for reconstructing an image based on compressive sensing measurements of the image may include the following operations.

The method may include receiving the compressive sensing measurements of the image, e.g., from a compressive sensing device.

The method may also include executing a reconstruction algorithm on the compressive sensing measurements, wherein said executing the reconstruction algorithm includes computing successive estimates of the image using the compressive sensing measurements, and, for each of the successive image estimates, computing an N×N Hadamard transform on the image estimate, wherein N is not a power of two.

The action of computing the N×N Hadamard transform on the image estimate may include: (a) partitioning the N components of a vector x representing the image estimate into M distinct subsets of components; (b) computing intermediate values, wherein the intermediate values comprise M distinct groups of intermediate values, wherein the intermediate values in each group are determined by computing linear combinations of the components in a respective one of the M distinct subsets, wherein coefficients of the linear combinations are from the set $\{1,-1\}$; and (c) computing N resultant values, wherein each of the N resultant values is computed as a corresponding linear combination of a corresponding subset of the intermediate values, wherein coefficients of the linear combinations are from the set $\{1,-1\}$, wherein the resultant values represent the Hadamard transform of the image estimate.

In one set of embodiments, a method for facilitating the sensing of a signal may include the following operations.

The method may include randomly or pseudo-randomly generating an index $m_i$ in the range $\{0, 1, 2, \ldots, N-1\}$, wherein the index $m_i$ identifies a row of an N×N matrix Z having the form of a Kronecker product $X \otimes Y$ between a matrix X and a matrix Y, wherein X is an F×F matrix, where Y is a B×B matrix, wherein N=BF, wherein B and F are integers greater than one. In some embodiments B may contain a prime factor other than 2.

The method may also include operating on the index $m_i$ to obtain an index k and an index l, wherein index k identifies a row of the matrix Y, wherein the index l identifies a row of the matrix X.

The method may also include generating the $k^{th}$ row of the matrix Y.

The method may also include generating selectively-modified copies of the $k^{th}$ row of the matrix Y, wherein the selective modification of copies is controlled by respective elements in the $l^{th}$ row of the matrix X, wherein the selectively-modified copies collectively form the $m_i^{th}$ row of the matrix Z.

The method may also include supplying the selectively-modified copies to an array of signal modulating elements to enable the array to modulate the signal with the $m_i^{th}$ row of the matrix Z.

Furthermore, the above-described actions may be repeated a plurality of times, e.g., to supply a random collection of rows of the matrix Z to the signal modulating array.

Additional embodiments are described in U.S. Provisional Application No. 61/753,359, filed on Jan. 16, 2013.

BRIEF DESCRIPTION OF THE DRAWINGS

A better understanding of the present invention can be obtained when the following detailed description of the preferred embodiments is considered in conjunction with the following drawings.

FIG. 8 illustrates the Hadamard matrix $H_{12}$.

FIG. 9 illustrates the Hadamard matrix $H_{20}$.

FIG. 10 illustrates a set of computations used to perform part of a $H_{20}$ transform, according to one embodiment.

FIG. 11 illustrates one embodiment of a method for reconstructing an image using a fast Hadamard transform that includes a coarse scale transform followed by fine scale transforms.

FIG. 12 illustrates one embodiment of a fast Hadamard transform that involves operating on columns of a two dimensional array, and separately operating on rows of the two-dimensional array.

FIG. 13 illustrates one embodiment of a method for performing a Hadamard transform by performing two stages of linear summations.

FIG. 13B illustrates one embodiment of method for reconstructing an image using the method of FIG. 13.

FIG. 14 illustrates one embodiment of a method for supplying randomly selected rows of a matrix Z to a signal modulating array in the situation where the matrix Z has the form of a Kronecker product $X \otimes Y$ between a matrix X and a matrix Y.

Figure 1:
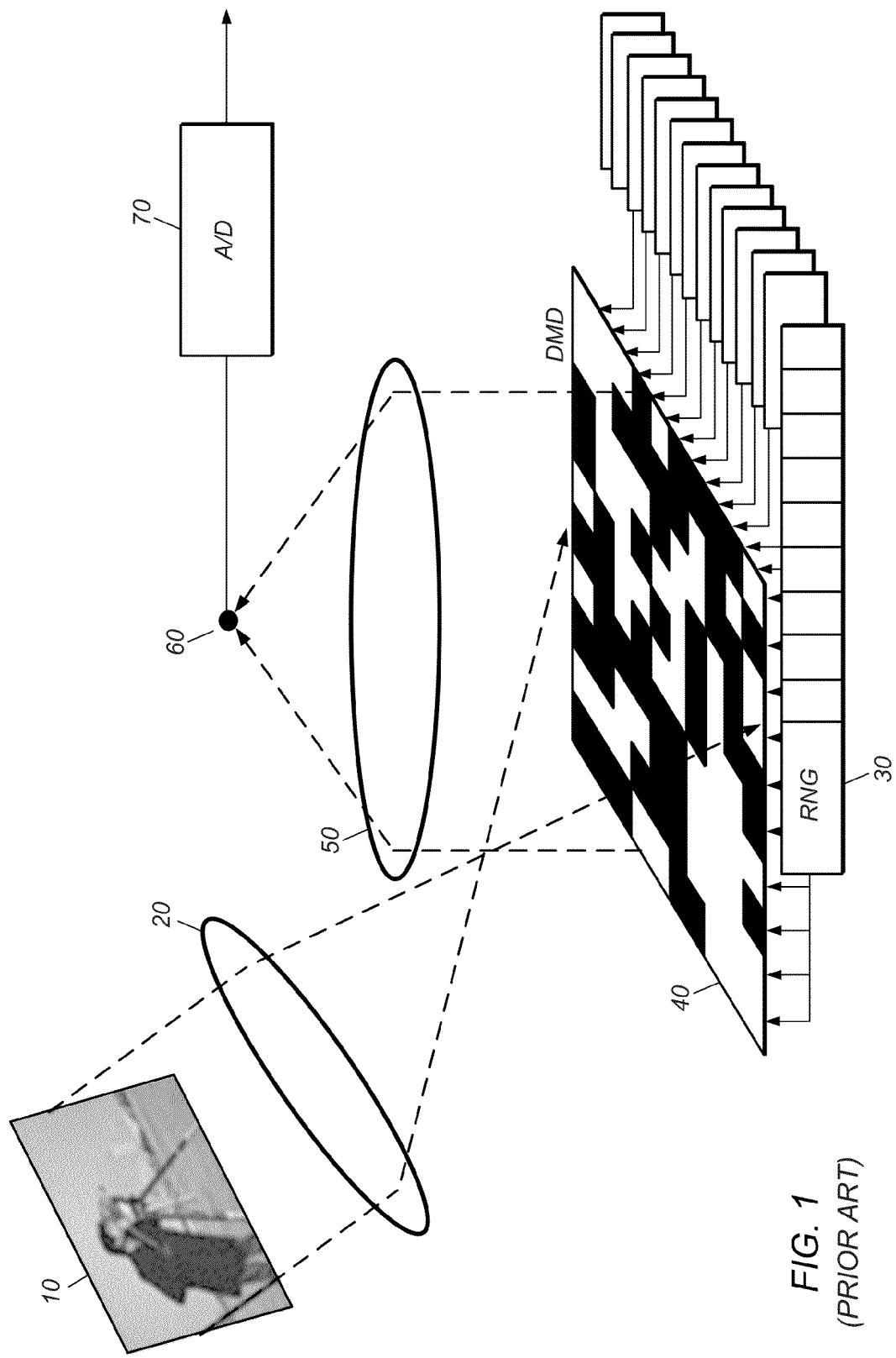
FIG. 1 illustrates a compressive sensing camera according to the prior art.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Incorporations by Reference

The following documents are hereby incorporated by reference in their entireties as though fully and completely set forth herein.

U.S. patent application Ser. No. 13/207,900, filed Aug. 11, 2011, entitled "TIR Prism to Separate Incident Light and Modulated Light in Compressive Imaging Device", invented by McMackin and Chatterjee;

U.S. patent application Ser. No. 13/197,304, filed Aug. 3, 2011, entitled "Decreasing Image Acquisition Time for Compressive Imaging Devices", invented by Kelly, Baraniuk, McMackin, Bridge, Chatterjee and Weston;

U.S. patent application Ser. No. 14/106,542, filed Dec. 13, 2013, entitled "Overlap Patterns and Image Stitching for Multiple-Detector Compressive-Sensing Camera", invented by Herman, Hewitt, Weston and McMackin.

TERMINOLOGY

A memory medium is a non-transitory medium configured for the storage and retrieval of information. Examples of memory media include: various kinds of semiconductor-based memory such as RAM and ROM; various kinds of magnetic media such as magnetic disk, tape, strip and film; various kinds of optical media such as CD-ROM and DVD-ROM; various media based on the storage of electrical charge and/or any of a wide variety of other physical quantities; media fabricated using various lithographic techniques; etc. The term "memory medium" includes within its scope of meaning the possibility that a given memory medium might be a union of two or more memory media that reside at different locations, e.g., in different portions of an integrated circuit or on different integrated circuits in an electronic system or on different computers in a computer network.

A computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

A computer system is any device (or combination of devices) having at least one processor that is configured to execute program instructions stored on a memory medium. Examples of computer systems include personal computers (PCs), workstations, laptop computers, tablet computers, mainframe computers, server computers, client computers, network or Internet appliances, hand-held devices, mobile devices, personal digital assistants (PDAs), tablet computers, computer-based television systems, grid computing systems, wearable computers, computers implanted in living organisms, computers embedded in head-mounted displays, computers embedded in sensors forming a distributed network, computers embedded in a camera devices or imaging devices or spectral measurement devices, etc.

A programmable hardware element (PHE) is a hardware device that includes multiple programmable function blocks connected via a system of programmable interconnects. Examples of PHEs include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores).

As used herein, the term "light" is meant to encompass within its scope of meaning any electromagnetic radiation whose spectrum lies within the wavelength range $[\lambda_L, \lambda_U]$, where the wavelength range includes the visible spectrum, the ultra-violet (UV) spectrum, infrared (IR) spectrum and the terahertz (THz) spectrum. Thus, for example, visible radiation, or UV radiation, or IR radiation, or THz radiation, or any combination thereof is "light" as used herein.

In some embodiments, a computer system may be configured to include a processor (or a set of processors) and a memory medium, where the memory medium stores program instructions, where the processor is configured to read and execute the program instructions stored in the memory medium, where the program instructions are executable by the processor to implement a method, e.g., any of the various method embodiments described herein, or, any combination of the method embodiments described herein, or, any subset of any of the method embodiments described herein, or, any combination of such subsets.

System 100 for Operating on Light

Figure 2A:
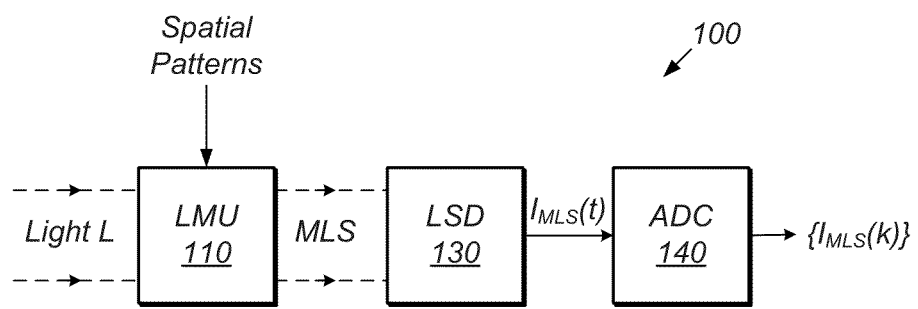
FIG. 2A illustrates one embodiment of a system 100 that is operable to capture compressive imaging samples and also samples of background light level. (LMU is an acronym for "light modulation unit". MLS is an acronym for "modulated light stream". LSD is an acronym for "light sensing device".)

A system 100 for operating on light may be configured as shown in FIG. 2A. The system 100 may include a light modulation unit 110, a light sensing device 130 and an analog-to-digital converter (ADC) 140.

The light modulation unit 110 is configured to modulate a received stream of light L with a series of spatial patterns in order to produce a modulated light stream (MLS). The spatial patterns of the series may be applied sequentially to the light stream so that successive time slices of the light stream are modulated, respectively, with successive ones of the spatial patterns. (The action of sequentially modulating the light stream L with the spatial patterns imposes the structure of time slices on the light stream.) The light modulation unit 110 includes a plurality of light modulating elements configured to modulate corresponding portions of the light stream. Each of the spatial patterns specifies an amount (or extent or value) of modulation for each of the light modulating elements. Mathematically, one might think of the light modulation unit's action of applying a given spatial pattern as performing an element-wise multiplication of a light field vector $(x_{ij})$ representing a time slice of the light stream L by a vector of scalar modulation values $(m_{ij})$, to obtain a time slice of the modulated light stream: $(m_{ij})*(x_{ij})=(m_{ij}*x_{ij})$. The vector $(m_{ij})$ is specified by the spatial pattern. Each light modulating element effectively scales (multiplies) the intensity of its corresponding light stream portion by the corresponding scalar factor.

The light modulation unit 110 may be realized in various ways. In some embodiments, the LMU 110 may be realized by a plurality of mirrors (e.g., micromirrors) whose orientations are independently controllable. In another set of embodiments, the LMU 110 may be realized by an array of elements whose transmittances are independently controllable, e.g., as with an array of LCD shutters. An electrical control signal supplied to each element controls the extent to which light is able to transmit through the element. In yet another set of embodiments, the LMU 110 may be realized by an array of independently-controllable mechanical shutters (e.g., micromechanical shutters) that cover an array of apertures, with the shutters opening and closing in response to electrical control signals, thereby controlling the flow of light through the corresponding apertures. In yet another set of embodiments, the LMU 110 may be realized by a perforated mechanical plate, with the entire plate moving in response to electrical control signals, thereby controlling the flow of light through the corresponding perforations. In yet another set of embodiments, the LMU 110 may be realized by an array of transceiver elements, where each element receives and then immediately retransmits light in a controllable fashion. In yet another set of embodiments, the LMU 110 may be realized by a grating light valve (GLV) device. In yet another embodiment, the LMU 110 may be realized by a liquid-crystal-on-silicon (LCOS) device.

In some embodiments, the light modulating elements are arranged in an array, e.g., a two-dimensional array or a one-dimensional array. Any of various array geometries are contemplated. For example, in some embodiments, the array is a square array or rectangular array. In another embodiment, the array is hexagonal. In some embodiments, the light modulating elements are arranged in a spatially random fashion.

Let N denote the number of light modulating elements in the light modulation unit 110. In various embodiments, the number N may take a wide variety of values. For example, in different sets of embodiments, N may be, respectively, in the range [64, 256], in the range [256, 1024], in the range [1024, 4096], in the range $[2^{12},2^{14}]$, in the range $[2^{14},2^{16}]$, in the range $[2^{16},2^{18}]$, in the range $[2^{18},2^{20}]$, in the range $[2^{20},2^{22}]$, in the range $[2^{22},2^{24}]$, in the range $[2^{24},2^{26}]$, in the range from $2^{26}$ to infinity. The particular value used in any given embodiment may depend on one or more factors specific to the embodiment.

The light sensing device 130 may be configured to receive the modulated light stream MLS and to generate an analog electrical signal $I_{MLS}(t)$ representing intensity of the modulated light stream as a function of time.

The light sensing device 130 may include one or more light sensing elements. The term "light sensing element" may be interpreted as meaning "a transducer between a light signal and an electrical signal". For example, a photodiode is a light sensing element. In various other embodiments, light sensing elements might include devices such as metal-semiconductor-metal (MSM) photodetectors, phototransistors, phototubes and photomultiplier tubes.

In some embodiments, the light sensing device 130 includes one or more amplifiers (e.g., transimpedance amplifiers) to amplify the analog electrical signals generated by the one or more light sensing elements.

The ADC 140 acquires a sequence of samples $\{I_{MLS}(k)\}$ of the analog electrical signal $I_{MLS}(t)$. Each of the samples may be interpreted as an inner product between a corresponding time slice of the light stream L and a corresponding one of the spatial patterns. The set of samples $\{I_{MLS}(k)\}$ comprises an encoded representation, e.g., a compressed representation, of an image (or a video sequence) and may be used to reconstruct the image (or video sequence) based on any reconstruction algorithm known in the field of compressive sensing. (For video sequence reconstruction, the samples may be partitioned into contiguous subsets, and then the subsets may be processed to reconstruct corresponding images.)

In some embodiments, the samples $\{I_{MLS}(k)\}$ may be used for some purpose other than, or in addition to, image (or video) reconstruction. For example, system 100 (or some other system) may operate on the samples to perform an inference task, such as detecting the presence of a signal or object, identifying a signal or an object, classifying a signal or an object, estimating one or more parameters relating to a signal or an object, tracking a signal or an object, etc. In some embodiments, an object under observation by system 100 may be identified or classified by virtue of its sample set $\{I_{MLS}(k)\}$ (or parameters derived from that sample set) being similar to one of a collection of stored sample sets (or parameter sets).

In some embodiments, the light sensing device 130 includes exactly one light sensing element. (For example, the single light sensing element may be a photodiode.) The light sensing element may couple to an amplifier (e.g., a TIA) (e.g., a multi-stage amplifier).

In some embodiments, the light sensing device 130 may include a plurality of light sensing elements (e.g., photodiodes). Each light sensing element may convert light impinging on its light sensing surface into a corresponding analog electrical signal representing intensity of the impinging light as a function of time. In some embodiments, each light sensing element may couple to a corresponding amplifier so that the analog electrical signal produced by the light sensing element can be amplified prior to digitization. System 100 may be configured so that each light sensing element receives, e.g., a corresponding spatial portion (or spectral portion) of the modulated light stream.

In one embodiment, the analog electrical signals produced, respectively, by the light sensing elements may be summed to obtain a sum signal. The sum signal may then be digitized by the ADC 140 to obtain the sequence of samples $\{I_{MLS}(k)\}$. In another embodiment, the analog electrical signals may be individually digitized, each with its own ADC, to obtain corresponding sample sequences. The sample sequences may then be added to obtain the sequence $\{I_{MLS}(k)\}$. In another embodiment, the analog electrical signals produced by the light sensing elements may be sampled by a smaller number of ADCs than light sensing elements through the use of time multiplexing. For example, in one embodiment, system 100 may be configured to sample two or more of the analog electrical signals by switching the input of an ADC among the outputs of the two or more corresponding light sensing elements at a sufficiently high rate.

In some embodiments, the light sensing device 130 may include an array of light sensing elements. Arrays of any of a wide variety of sizes, configurations and material technologies are contemplated. In one embodiment, the light sensing device 130 includes a focal plane array coupled to a readout integrated circuit. In one embodiment, the light sensing device 130 may include an array of cells, where each cell includes a corresponding light sensing element and is configured to integrate and hold photo-induced charge created by the light sensing element, and to convert the integrated charge into a corresponding cell voltage. The light sensing device may also include (or couple to) circuitry configured to sample the cell voltages using one or more ADCs.

In some embodiments, the light sensing device 130 may include a plurality (or array) of light sensing elements, where each light sensing element is configured to receive a corresponding spatial portion of the modulated light stream, and each spatial portion of the modulated light stream comes from a corresponding sub-region of the array of light modulating elements. (For example, the light sensing device 130 may include a quadrant photodiode, where each quadrant of the photodiode is configured to receive modulated light from a corresponding quadrant of the array of light modulating elements. As another example, the light sensing device 130 may include a bi-cell photodiode. As yet another example, the light sensing device 130 may include a focal plane array.) Each light sensing element generates a corresponding signal representing intensity of the corresponding spatial portion as a function of time. Each signal may be digitized (e.g., by a corresponding ADC, or perhaps by a shared ADC) to obtain a corresponding sequence of samples. Thus, a plurality of sample sequences are obtained, one sample sequence per light sensing element. Each sample sequence may be processed to reconstruct a corresponding sub-image (or sub-video sequence). The sub-images may be joined together to form a whole image (or whole video sequence). The sample sequences may be captured in response to the modulation of the incident light stream with a sequence of M spatial patterns, e.g., as variously described above. By employing any of various reconstruction algorithms known in the field of compressive sensing, the number of pixels (voxels) in each reconstructed image (sub-video sequence) may be greater than (e.g., much greater than) M. To reconstruct each sub-image (sub-video), the reconstruction algorithm uses the corresponding sample sequence and the restriction of the spatial patterns to the corresponding sub-region of the array of light modulating elements.

In some embodiments, the light sensing device 130 includes a small number of light sensing elements (e.g., in respective embodiments, one, two, less than 8, less than 16, less the 32, less than 64, less than 128, less than 256). Because the light sensing device of these embodiments includes a small number of light sensing elements (e.g., far less than the typical modern CCD-based or CMOS-based camera), an entity interested in producing any of these embodiments may afford to spend more per light sensing element to realize features that are beyond the capabilities of modern array-based image sensors of large pixel count, e.g., features such as higher sensitivity, extended range of sensitivity, new range(s) of sensitivity, extended dynamic range, higher bandwidth/lower response time. Furthermore, because the light sensing device includes a small number of light sensing elements, an entity interested in producing any of these embodiments may use newer light sensing technologies (e.g., based on new materials or combinations of materials) that are not yet mature enough to be manufactured into focal plane arrays (FPA) with large pixel count. For example, new detector materials such as super-lattices, quantum dots, carbon nano-tubes and graphene can significantly enhance the performance of IR detectors by reducing detector noise, increasing sensitivity, and/or decreasing detector cooling requirements.

In one embodiment, the light sensing device 130 is a thermo-electrically cooled InGaAs detector. (InGaAs stands for "Indium Gallium Arsenide".) In other embodiments, the InGaAs detector may be cooled by other mechanisms (e.g., liquid nitrogen or a Sterling engine). In yet other embodiments, the InGaAs detector may operate without cooling. In yet other embodiments, different detector materials may be used, e.g., materials such as MCT (mercury-cadmium-telluride), InSb (Indium Antimonide) and VOx (Vanadium Oxide).

In different embodiments, the light sensing device 130 may be sensitive to light at different wavelengths or wavelength ranges. In some embodiments, the light sensing device 130 may be sensitive to light over a broad range of wavelengths, e.g., over the entire visible spectrum or over the entire range $[\lambda_L, \lambda_U]$ as defined above.

In some embodiments, the light sensing device 130 may include one or more dual-sandwich photodetectors. A dual sandwich photodetector includes two photodiodes stacked (or layered) one on top of the other.

In one embodiment, the light sensing device 130 may include one or more avalanche photodiodes.

In one embodiment, the light sensing device 130 may include one or more photomultiplier tubes (PMTs).

In some embodiments, a filter may be placed in front of the light sensing device 130 to restrict the modulated light stream to a specific range of wavelengths or specific polarization. Thus, the signal $I_{MLS}(t)$ generated by the light sensing device 130 may be representative of the intensity of the restricted light stream. For example, by using a filter that passes only IR light, the light sensing device may be effectively converted into an IR detector. The sample principle may be applied to effectively convert the light sensing device into a detector for red or blue or green or UV or any desired wavelength band, or, a detector for light of a certain polarization.

In some embodiments, system 100 includes a color wheel whose rotation is synchronized with the application of the spatial patterns to the light modulation unit. As it rotates, the color wheel cyclically applies a number of optical bandpass filters to the modulated light stream MLS. Each bandpass filter restricts the modulated light stream to a corresponding sub-band of wavelengths. Thus, the samples captured by the ADC 140 will include samples of intensity in each of the sub-bands. The samples may be de-multiplexed to form separate sub-band sequences. Each sub-band sequence may be processed to generate a corresponding sub-band image. (As an example, the color wheel may include a red-pass filter, a green-pass filter and a blue-pass filter to support color imaging.)

In some embodiments, the system 100 may include a memory (or a set of memories of one or more kinds).

Figure 2B:
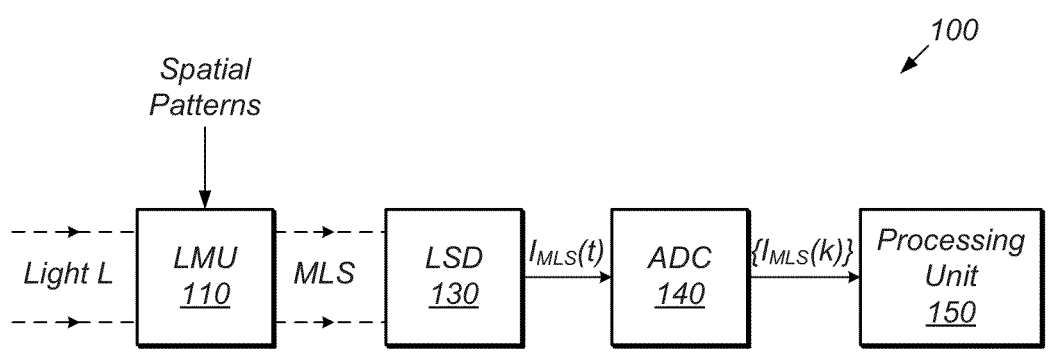
FIG. 2B illustrates an embodiment of system 100 that includes a processing unit 150.

In some embodiments, system 100 may include a processing unit 150, e.g., as shown in FIG. 2B. The processing unit 150 may be a digital circuit or a combination of digital circuits. For example, the processing unit may be a microprocessor (or system of interconnected of microprocessors), a programmable hardware element such as a field-programmable gate array (FPGA), an application specific integrated circuit (ASIC), or any combination such elements. The processing unit 150 may be configured to perform one or more functions such as image/video reconstruction, system control, user interface, statistical analysis, and one or more inferences tasks.

The system 100 (e.g., the processing unit 150) may store the samples $\{I_{MLS}(k)\}$ in a memory, e.g., a memory resident in the system 100 or in some other system.

In one embodiment, processing unit 150 is configured to operate on the samples $\{I_{MLS}(k)\}$ to generate the image or video sequence. In this embodiment, the processing unit 150 may include a microprocessor configured to execute software (i.e., program instructions), especially software for performing an image/video reconstruction algorithm. In one embodiment, system 100 is configured to transmit the compensated samples to some other system through a communication channel. (In embodiments where the spatial patterns are randomly-generated, system 100 may also transmit the random seed(s) used to generate the spatial patterns.) That other system may operate on the samples to reconstruct the image/video. System 100 may have one or more interfaces configured for sending (and perhaps also receiving) data through one or more communication channels, e.g., channels such as wireless channels, wired channels, fiber optic channels, acoustic channels, laser-based channels, etc.

In some embodiments, processing unit 150 is configured to use any of a variety of algorithms and/or any of a variety of transformations to perform image/video reconstruction. System 100 may allow a user to choose a desired algorithm and/or a desired transformation for performing the image/video reconstruction.

In some embodiments, the system 100 is configured to acquire a set $Z_M$ of samples from the ADC 140 so that the sample set $Z_M$ corresponds to M of the spatial patterns applied to the light modulation unit 110, where M is a positive integer. The number M is selected so that the sample set $Z_M$ is useable to reconstruct an n-pixel image or n-voxel video sequence that represents the incident light stream, where n is a positive integer less than or equal to the number N of light modulating elements in the light modulation unit 110. System 100 may be configured so that the number M is smaller than n. Thus, system 100 may operate as a compressive sensing device. (The number of "voxels" in a video sequence is the number of images in the video sequence times the number of pixels per image, or equivalently, the sum of the pixel counts of the images in the video sequence.)

In various embodiments, the compression ratio M/n may take any of a wide variety of values. For example, in different sets of embodiments, M/n may be, respectively, in the range [0.9,0.8], in the range [0.8,0.7], in the range [0.7,0.6], in the range [0.6,0.5], in the range [0.5,0.4], in the range [0.4,0.3], in the range [0.3,0.2], in the range [0.2,0.1], in the range [0.1, 0.05], in the range [0.05,0.01], in the range [0.001,0.01].

Superpixels for Modulation at Lower Spatial Resolution

As noted above, the image reconstructed from the sample subset $Z_M$ may be an n-pixel image with n≤N. The spatial patterns may be designed to support a value of n less than N, e.g., by forcing the array of light modulating elements to operate at a lower effective resolution than the physical resolution N. For example, the spatial patterns may be designed to force each 2×2 cell of light modulating elements to act in unison. At any given time, the modulation state of the four elements in a 2×2 cell will agree. Thus, the effective resolution of the array of light modulating elements is reduced to N/4. This principle generalizes to any cell size, to cells of any shape, and to collections of cells with non-uniform cell size and/or cell shape. For example, a collection of cells of size $k_H \times k_V$, where $k_H$ and $k_V$ are positive integers, would give an effective resolution equal to $N/(k_H k_V)$. In one alternative embodiment, cells near the center of the array may have smaller sizes than cells near the periphery of the array.

The "cells" of the above discussion are referred to herein as "superpixels". When the reconstruction algorithm generates an image (video frame) from the acquired sample data, each superpixel corresponds to one pixel in the reconstructed image (video frame).

Restricting the Spatial Patterns to a Subset of the Modulation Array

Another way the spatial patterns may be arranged to support the reconstruction of an n-pixel image with n less than N is to allow the spatial patterns to vary only within a subset (or region) of the array of light modulating elements. In this mode of operation, the spatial patterns are null (take the value zero) outside the subset. (Control unit 120 may be configured to implement this restriction of the spatial patterns.) Light modulating elements corresponding to positions outside of the subset do not send any light (or send only the minimum amount of light attainable) to the light sensing device. Thus, the reconstructed image is restricted to the subset. In some embodiments, each spatial pattern (e.g., of a measurement pattern sequence) may be multiplied element-wise by a binary mask that takes the one value only in the allowed subset, and the resulting product pattern may be supplied to the light modulation unit. In some embodiments, the subset is a contiguous region of the array of light modulating elements, e.g., a rectangle or a circular disk or a hexagon. In some embodiments, the size and/or position of the region may vary (e.g., dynamically). The position of the region may vary in order to track a moving object. The size of the region may vary in order to dynamically control the rate of image acquisition or video frame rate. In some embodiments, the size of the region may be determined by user input. For example, system 100 may provide an input interface (GUI and/or mechanical control device) through which the user may vary the size of the region over a continuous range of values (or alternatively, a discrete set of values), thereby implementing a digital zoom function. Furthermore, in some embodiments, the position of the region within the field of view may be controlled by user input.

Oversampling Relative to Pattern Modulation Rate

In some embodiments, the A/D converter 140 may oversample the electrical signal generated by the light sensing device 130, i.e., acquire samples of the electrical signal at a rate higher than (e.g., a multiple of) the pattern modulation rate. The pattern modulation rate is the rate at which the spatial patterns are applied to the incident light stream L by the light modulation unit 110. Thus, the A/D converter may generate a plurality of samples per spatial pattern. The plurality of samples may be averaged to obtain a single averaged sample per spatial pattern. The averaging tends to reduce noise, and thus, to increase quality of image reconstruction. The averaging may be performed by processing unit 150 or some other processing agent. The oversampling ratio may be controlled by setting the pattern modulation rate and/or setting the A/D sampling rate.

In one embodiment, system 100 may include a light transmitter configured to generate a light beam (e.g., a laser beam), to modulate the light beam with a data signal and to transmit the modulated light beam into space or onto an optical fiber. System 100 may also include a light receiver configured to receive a modulated light beam from space or from an optical fiber, and to recover a data stream from the received modulated light beam.

In one embodiment, system 100 may be configured as a low-cost sensor system having minimal processing resources, e.g., processing resources insufficient to perform image (or video) reconstruction in user-acceptable time. In this embodiment, the system 100 may store and/or transmit the samples {$I_{MLS}(k)$} so that another agent, more plentifully endowed with processing resources, may perform the image/video reconstruction based on the samples.

Figure 2C:
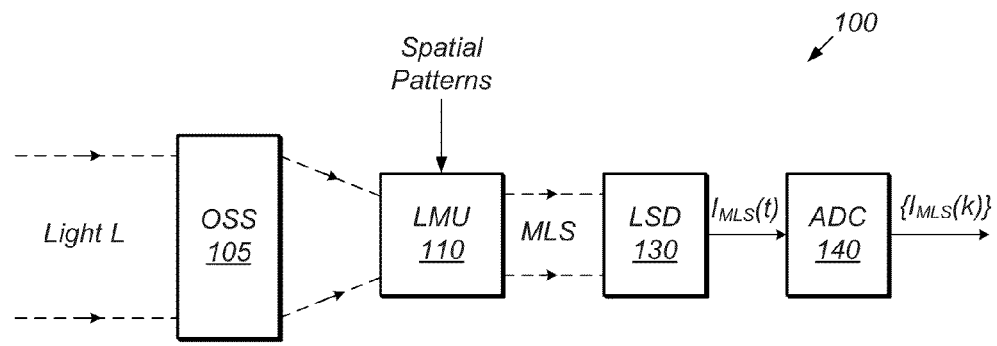
FIG. 2C illustrates an embodiment of system 100 that includes an optical subsystem 105 to focus received light L onto the light modulation unit 110.
Figure 2D:
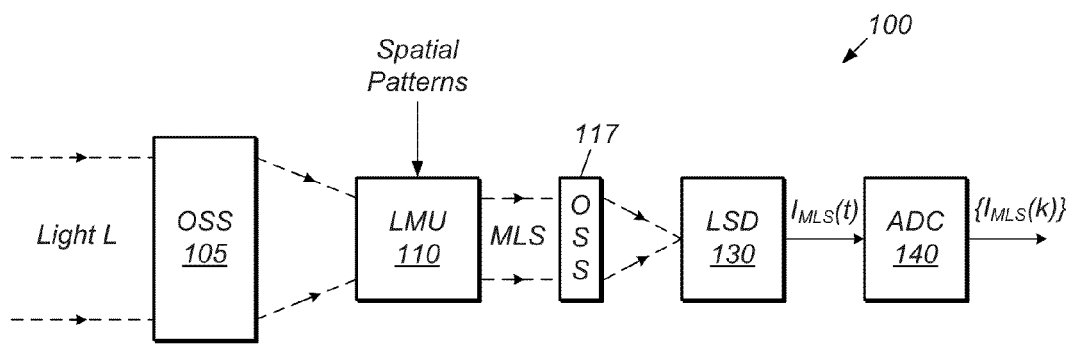
FIG. 2D illustrates an embodiment of system 100 that includes an optical subsystem 117 to direct or focus or concentrate the modulated light stream MLS onto the light sensing device 130.

In some embodiments, system 100 may include an optical subsystem 105 that is configured to modify or condition the light stream L before it arrives at the light modulation unit 110, e.g., as shown in FIG. 2C. For example, the optical subsystem 105 may be configured to receive the light stream L from the environment and to focus the light stream onto a modulating plane of the light modulation unit 110. The optical subsystem 105 may include a camera lens (or a set of lenses). The lens (or set of lenses) may be adjustable to accommodate a range of distances to external objects being imaged/sensed/captured. The optical subsystem 105 may allow manual and/or digital control of one or more parameters such as focus, zoom, shutter speed and f-stop.

In some embodiments, system 100 may include an optical subsystem 117 to direct the modulated light stream MLS onto a light sensing surface (or surfaces) of the light sensing device 130.

In some embodiments, the optical subsystem 117 may include one or more lenses, and/or, one or more mirrors.

In some embodiments, the optical subsystem 117 is configured to focus the modulated light stream onto the light sensing surface (or surfaces). The term "focus" implies an attempt to achieve the condition that rays (photons) diverging from a point on an object plane converge to a point (or an acceptably small spot) on an image plane. The term "focus" also typically implies continuity between the object plane point and the image plane point (or image plane spot); points close together on the object plane map respectively to points (or spots) close together on the image plane. In at least some of the system embodiments that include an array of light sensing elements, it may be desirable for the modulated light stream MLS to be focused onto the light sensing array so that there is continuity between points on the light modulation unit LMU and points (or spots) on the light sensing array.

In some embodiments, the optical subsystem 117 may be configured to direct the modulated light stream MLS onto the light sensing surface (or surfaces) of the light sensing device 130 in a non-focusing fashion. For example, in a system embodiment that includes only one photodiode, it may not be so important to achieve the "in focus" condition at the light sensing surface of the photodiode since positional information of photons arriving at that light sensing surface will be immediately lost.

In one embodiment, the optical subsystem 117 may be configured to receive the modulated light stream and to concentrate the modulated light stream into an area (e.g., a small area) on a light sensing surface of the light sensing device 130. Thus, the diameter of the modulated light stream may be reduced (possibly, radically reduced) in its transit from the optical subsystem 117 to the light sensing surface (or surfaces) of the light sensing device 130. For example, in some embodiments, the diameter may be reduced by a factor of more than 1.5 to 1. In other embodiments, the diameter may be reduced by a factor of more than 2 to 1. In yet other embodiments, the diameter may be reduced by a factor of more than 10 to 1. In yet other embodiments, the diameter may be reduced by factor of more than 100 to 1. In yet other embodiments, the diameter may be reduced by factor of more than 400 to 1. In one embodiment, the diameter is reduced so that the modulated light stream is concentrated onto the light sensing surface of a single light sensing element (e.g., a single photodiode).

In some embodiments, this feature of concentrating the modulated light stream onto the light sensing surface (or surfaces) of the light sensing device allows the light sensing device to sense at any given time the sum (or surface integral) of the intensities of the modulated light portions within the modulated light stream. (Each time slice of the modulated light stream comprises a spatial ensemble of modulated light portions due to the modulation unit's action of applying the corresponding spatial pattern to the light stream.)

In some embodiments, the modulated light stream MLS may be directed onto the light sensing surface of the light sensing device 130 without concentration, i.e., without decrease in diameter of the modulated light stream, e.g., by use of photodiode having a large light sensing surface, large enough to contain the cross section of the modulated light stream without the modulated light stream being concentrated.

Figure 2E:
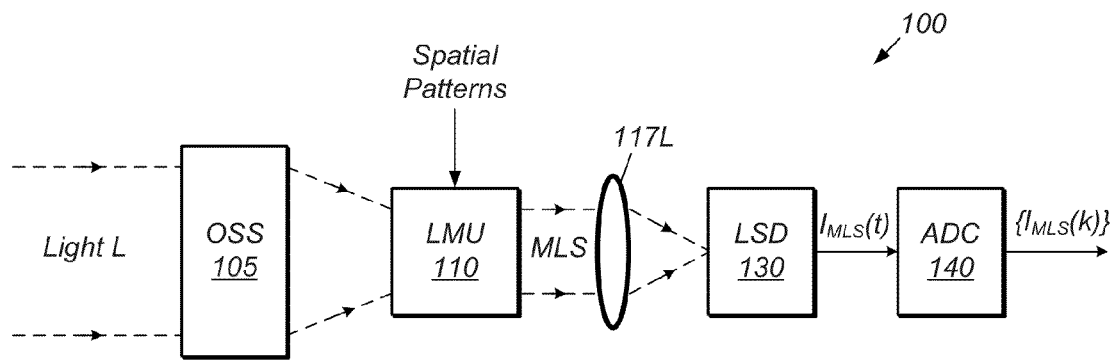
FIG. 2E illustrates an embodiment where the optical subsystem 117 is realized by a lens 117L.

In some embodiments, the optical subsystem 117 may include one or more lenses. FIG. 2E shows an embodiment where optical subsystem 117 is realized by a lens 117L, e.g., a biconvex lens or a condenser lens.

In some embodiments, the optical subsystem 117 may include one or more mirrors. In one embodiment, the optical subsystem 117 includes a parabolic mirror (or spherical mirror) to concentrate the modulated light stream onto a neighborhood (e.g., a small neighborhood) of the parabolic focal point. In this embodiment, the light sensing surface of the light sensing device may be positioned at the focal point.

In some embodiments, system 100 may include an optical mechanism (e.g., an optical mechanism including one or more prisms and/or one or more diffraction gratings) for splitting or separating the modulated light stream MLS into two or more separate streams (perhaps numerous streams), where each of the streams is confined to a different wavelength range. The separate streams may each be sensed by a separate light sensing device. (In some embodiments, the number of wavelength ranges may be, e.g., greater than 8, or greater than 16, or greater than 64, or greater than 256, or greater than 1024.) Furthermore, each separate stream may be directed (e.g., focused or concentrated) onto the corresponding light sensing device as described above in connection with optical subsystem 117. The samples captured from each light sensing device may be used to reconstruct a corresponding image (or video sequence) for the corresponding wavelength range. In one embodiment, the modulated light stream is separated into red, green and blue streams to support color (R,G,B) measurements. In another embodiment, the modulated light stream may be separated into IR, red, green, blue and UV streams to support five-channel multi-spectral imaging: (IR, R, G, B, UV). In some embodiments, the modulated light stream may be separated into a number of sub-bands (e.g., adjacent sub-bands) within the IR band to support multi-spectral or hyper-spectral IR imaging. In some embodiments, the number of IR sub-bands may be, e.g., greater than 8, or greater than 16, or greater than 64, or greater than 256, or greater than 1024. In some embodiments, the modulated light stream may experience two or more stages of spectral separation. For example, in a first stage the modulated light stream may be separated into an IR stream confined to the IR band and one or more additional streams confined to other bands. In a second stage, the IR stream may be separated into a number of sub-bands (e.g., numerous sub-bands) (e.g., adjacent sub-bands) within the IR band to support multispectral or hyper-spectral IR imaging.

In some embodiments, system 100 may include an optical mechanism (e.g., a mechanism including one or more beam splitters) for splitting or separating the modulated light stream MLS into two or more separate streams, e.g., where each of the streams have the same (or approximately the same) spectral characteristics or wavelength range. The separate streams may then pass through respective bandpass filters to obtain corresponding modified streams, where each modified stream is restricted to a corresponding band of wavelengths. Each of the modified streams may be sensed by a separate light sensing device. (In some embodiments, the number of wavelength bands may be, e.g., greater than 8, or greater than 16, or greater than 64, or greater than 256, or greater than 1024.) Furthermore, each of the modified streams may be directed (e.g., focused or concentrated) onto the corresponding light sensing device as described above in connection with optical subsystem 117. The samples captured from each light sensing device may be used to reconstruct a corresponding image (or video sequence) for the corresponding wavelength band. In one embodiment, the modulated light stream is separated into three streams which are then filtered, respectively, with a red-pass filter, a green-pass filter and a blue-pass filter. The resulting red, green and blue streams are then respectively detected by three light sensing devices to support color (R,G,B) acquisition. In another similar embodiment, five streams are generated, filtered with five respective filters, and then measured with five respective light sensing devices to support (IR, R, G, B, UV) multi-spectral acquisition. In yet another embodiment, the modulated light stream of a given band may be separated into a number of (e.g., numerous) sub-bands to support multi-spectral or hyper-spectral imaging.

In some embodiments, system 100 may include an optical mechanism for splitting or separating the modulated light stream MLS into two or more separate streams. The separate streams may be directed to (e.g., concentrated onto) respective light sensing devices. The light sensing devices may be configured to be sensitive in different wavelength ranges, e.g., by virtue of their different material properties. Samples captured from each light sensing device may be used to reconstruct a corresponding image (or video sequence) for the corresponding wavelength range.

Figure 2F:
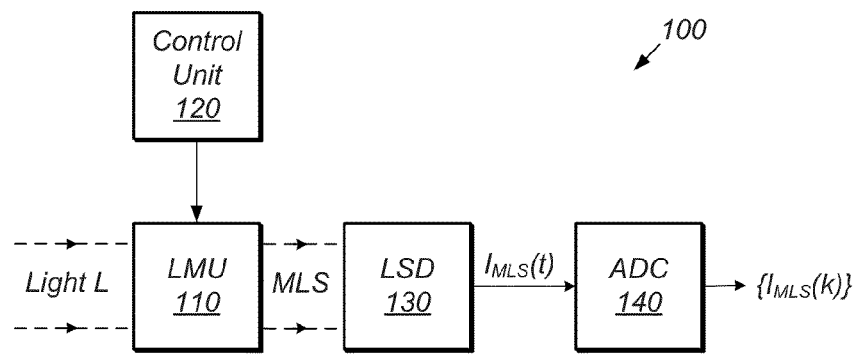
FIG. 2F illustrates an embodiment of system 100 that includes a control unit that is configured to supply a series of spatial patterns to the light modulation unit 110.

In some embodiments, system 100 may include a control unit 120 configured to supply the spatial patterns to the light modulation unit 110, as shown in FIG. 2F. The control unit may itself generate the patterns or may receive the patterns from some other agent. The control unit 120 and the ADC 140 may be controlled by a common clock signal so that ADC 140 can coordinate (synchronize) its action of capturing the samples $\{I_{MLS}(k)\}$ with the control unit's action of supplying spatial patterns to the light modulation unit 110. (System 100 may include clock generation circuitry.)

In some embodiments, the control unit 120 may supply the spatial patterns to the light modulation unit in a periodic fashion.

The control unit 120 may be a digital circuit or a combination of digital circuits. For example, the control unit may include a microprocessor (or system of interconnected of microprocessors), a programmable hardware element such as a field-programmable gate array (FPGA), an application specific integrated circuit (ASIC), or any combination such elements.

In some embodiments, the control unit 120 may include a random number generator (RNG) or a set of random number generators to generate the spatial patterns or some subset of the spatial patterns.

In some embodiments, system 100 is battery powered. In some embodiments, the system 100 includes a set of one or more solar cells and associated circuitry to derive power from sunlight.

In some embodiments, system 100 includes its own light source for illuminating the environment or a target portion of the environment.

In some embodiments, system 100 may include a display (or an interface configured for coupling to a display) for displaying reconstructed images/videos.

In some embodiments, system 100 may include one or more input devices (and/or, one or more interfaces for input devices), e.g., any combination or subset of the following devices: a set of buttons and/or knobs, a keyboard, a keypad, a mouse, a touch-sensitive pad such as a trackpad, a touch-sensitive display screen, one or more microphones, one or more temperature sensors, one or more chemical sensors, one or more pressure sensors, one or more accelerometers, one or more orientation sensors (e.g., a three-axis gyroscopic sensor), one or more proximity sensors, one or more antennas, etc.

Regarding the spatial patterns that are used to modulate the light stream L, it should be understood that there are a wide variety of possibilities. In some embodiments, the control unit 120 may be programmable so that any desired set of spatial patterns may be used.

In some embodiments, the spatial patterns are binary valued. Such an embodiment may be used, e.g., when the light modulating elements are two-state devices. In some embodiments, the spatial patterns are n-state valued, where each element of each pattern takes one of n states, where n is an integer greater than two. (Such an embodiment may be used, e.g., when the light modulating elements are each able to achieve n or more modulation states). In some embodiments, the spatial patterns are real valued, e.g., when each of the light modulating elements admits a continuous range of modulation. (It is noted that even a two-state modulating element may be made to effectively apply a continuous range of modulation by duty cycling the two states during modulation intervals.)

Coherence

The spatial patterns may belong to a set of measurement vectors that is incoherent with a set of vectors in which the image/video is approximately sparse ("the sparsity vector set"). (See "Sparse Signal Detection from Incoherent Projections", Proc. Int. Conf. Acoustics, Speech Signal Processing—ICASSP, May 2006, Duarte et al.) Given two sets of vectors A=$\{a_i\}$ and B=$\{b_i\}$ in the same N-dimensional space, A and B are said to be incoherent if their coherence measure $\mu(A,B)$ is sufficiently small. Assuming that the vectors $\{a_i\}$ and $\{b_i\}$ each have unit $L^2$ norm, then coherence measure may be defined as:

$$\mu(A, B) = \max_{i,j} |\langle a_i, b_i \rangle|.$$

The number of compressive sensing measurements (i.e., samples of the sequence $\{I_{MLS}(k)\}$ needed to reconstruct an N-pixel image (or N-voxel video sequence) that accurately represents the scene being captured is a strictly increasing function of the coherence between the measurement vector set and the sparsity vector set. Thus, better compression can be achieved with smaller values of the coherence.

In some embodiments, the measurement vector set may be based on a code. Any of various codes from information theory may be used, e.g., codes such as exponentiated Kerdock codes, exponentiated Delsarte-Goethals codes, run-length limited codes, LDPC codes, Reed Solomon codes and Reed Muller codes.

In some embodiments, the measurement vector set corresponds to a randomized or permuted basis, where the basis may be, for example, the DCT basis (DCT is an acronym for Discrete Cosine Transform) or Hadamard basis.

In some embodiments, the spatial patterns may be random or pseudo-random patterns, e.g., generated according to a random number generation (RNG) algorithm using one or more seeds. In some embodiments, the elements of each pattern are generated by a series of Bernoulli trials, where each trial has a probability p of giving the value one and probability 1−p of giving the value zero. (For example, in one embodiment p=½.) In some embodiments, the elements of each pattern are generated by a series of draws from a Gaussian random variable.)

The system 100 may be configured to operate in a compressive fashion, where the number of the samples $\{I_{MLS}(k)\}$ captured by the system 100 is less than (e.g., much less than) the number of pixels in the image (or video) to be reconstructed from the samples. In many applications, this compressive realization is very desirable because it saves on power consumption, memory utilization and transmission bandwidth consumption. However, non-compressive realizations are contemplated as well.

In some embodiments, the system 100 is configured as a camera or imager that captures information representing an image (or a series of images) from the external environment, e.g., an image (or a series of images) of some external object or scene. The camera system may take different forms in different application domains, e.g., domains such as visible light photography, infrared photography, ultraviolet photography, high-speed photography, low-light photography, underwater photography, multi-spectral imaging, hyperspectral imaging, etc. In some embodiments, system 100 is configured to operate in conjunction with (or as part of) another system, e.g., in conjunction with (or as part of) a microscope, a telescope, a robot, a security system, a surveillance system, a fire sensor, a node in a distributed sensor network, etc.

In some embodiments, system 100 is configured as a spectrometer.

In some embodiments, system 100 is configured as a multispectral or hyper-spectral imager.

In some embodiments, system 100 may configured as a single integrated package, e.g., as a camera.

In some embodiments, system 100 may also be configured to operate as a projector. Thus, system 100 may include a light source, e.g., a light source located at or near a focal point of optical subsystem 117. In projection mode, the light modulation unit 110 may be supplied with an image (or a sequence of images), e.g., by control unit 120. The light modulation unit may receive a light beam generated by the light source, and modulate the light beam with the image (or sequence of images) to obtain a modulated light beam. The modulated light beam exits the system 100 and is displayed on a display surface (e.g., an external screen).

In one embodiment, the light modulation unit 110 may receive the light beam from the light source and modulate the light beam with a time sequence of spatial patterns (from a measurement pattern set). The resulting modulated light beam exits the system 100 and is used to illuminate the external scene. Light reflected from the external scene in response to the modulated light beam is measured by a light sensing device (e.g., a photodiode). The samples captured by the light sensing device comprise compressive measurements of external scene. Those compressive measurements may be used to reconstruct an image or video sequence as variously described above.

In some embodiments, system 100 includes an interface for communicating with a host computer. The host computer may send control information and/or program code to the system 100 via the interface. Furthermore, the host computer may receive status information and/or compressive sensing measurements from system 100 via the interface.

Figure 3A:
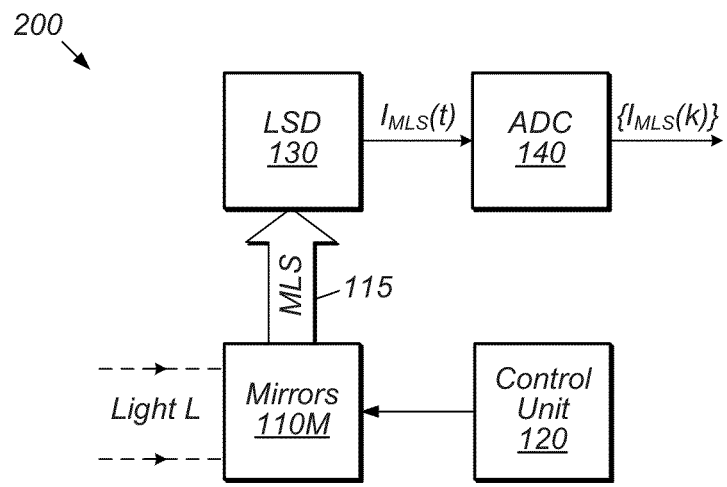
FIG. 3A illustrates system 200, where the light modulation unit 110 is realized by a plurality of mirrors (collectively referenced by label 110M).

In one realization 200 of system 100, the light modulation unit 110 may be realized by a plurality of mirrors, e.g., as shown in FIG. 3A. (The mirrors are collectively indicated by the label 110M.) The mirrors 110M are configured to receive corresponding portions of the light L received from the environment, albeit not necessarily directly from the environment. (There may be one or more optical elements, e.g., one or more lenses along the input path to the mirrors 110M.) Each of the mirrors is configured to controllably switch between at least two orientation states. In addition, each of the mirrors is configured to (a) reflect the corresponding portion of the light onto a sensing path 115 when the mirror is in a first of the two orientation states and (b) reflect the corresponding portion of the light away from the sensing path when the mirror is in a second of the two orientation states.

In some embodiments, the mirrors 110M are arranged in an array, e.g., a two-dimensional array or a one-dimensional array. Any of various array geometries are contemplated. For example, in different embodiments, the array may be a square array, a rectangular array, a hexagonal array, etc. In some embodiments, the mirrors are arranged in a spatially-random fashion.

The mirrors 110M may be part of a digital micromirror device (DMD). For example, in some embodiments, one of the DMDs manufactured by Texas Instruments may be used.

The control unit 120 may be configured to drive the orientation states of the mirrors through the series of spatial patterns, where each of the patterns of the series specifies an orientation state for each of the mirrors.

The light sensing device 130 may be configured to receive the light portions reflected at any given time onto the sensing path 115 by the subset of mirrors in the first orientation state and to generate an analog electrical signal $I_{MLS}(t)$ representing a cumulative intensity of the received light portions as function of time. As the mirrors are driven through the series of spatial patterns, the subset of mirrors in the first orientation state will vary from one spatial pattern to the next. Thus, the cumulative intensity of light portions reflected onto the sensing path 115 and arriving at the light sensing device will vary as a function time. Note that the term "cumulative" is meant to suggest a summation (spatial integration) over the light portions arriving at the light sensing device at any given time. This summation may be implemented, at least in part, optically (e.g., by means of a lens and/or mirror that concentrates or focuses the light portions onto a concentrated area as described above).

Figure 3B:
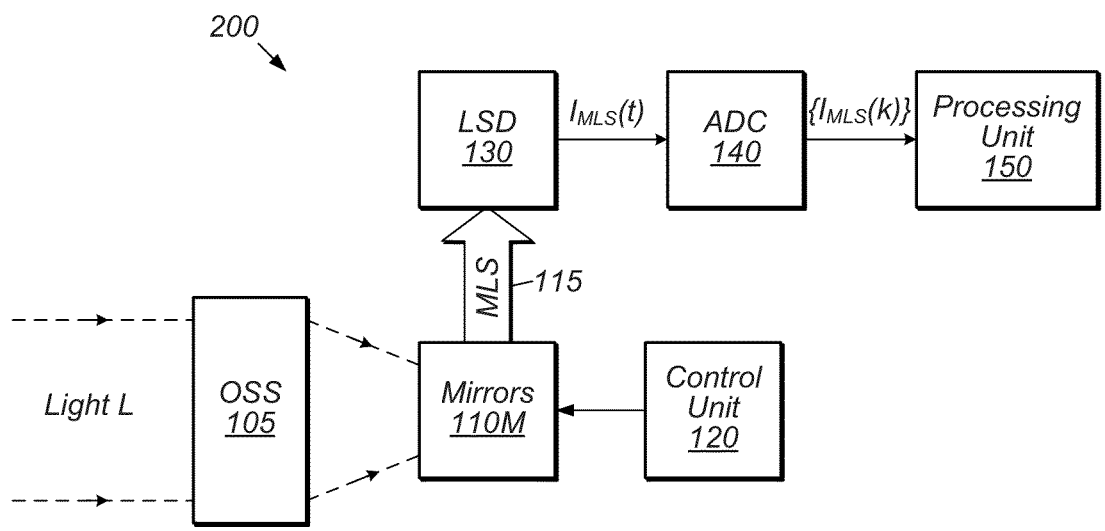
FIG. 3B shows an embodiment of system 200 that includes the processing unit 150.

System realization 200 may include any subset of the features, embodiments and elements discussed above with respect to system 100. For example, system realization 200 may include the optical subsystem 105 to operate on the incoming light L before it arrives at the mirrors 110M, e.g., as shown in FIG. 3B.

Figure 4:
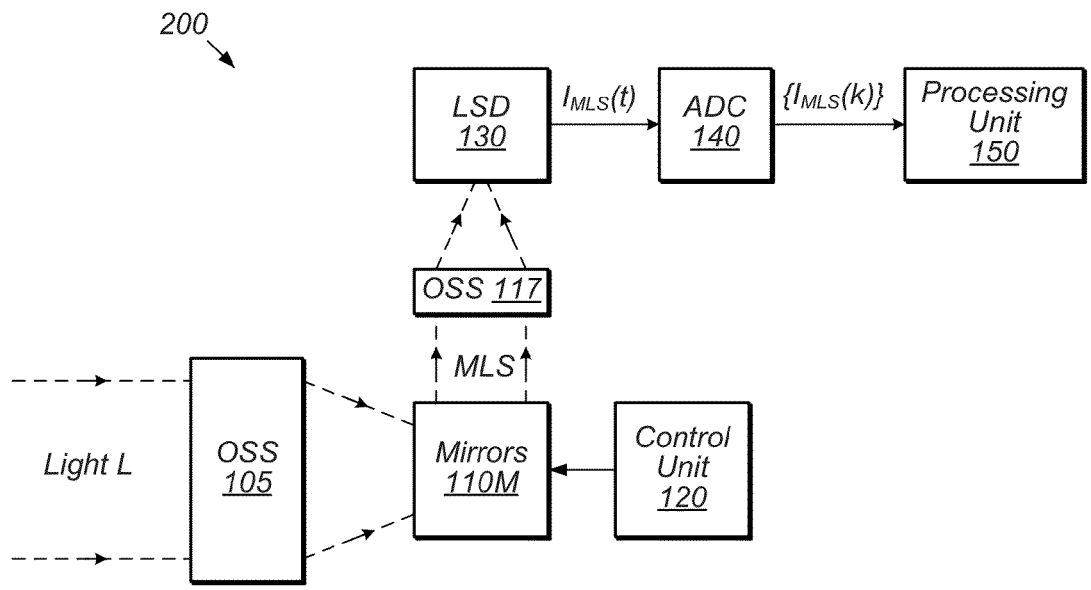
FIG. 4 shows an embodiment of system 200 that includes the optical subsystem 117 to direct or focus or concentrate the modulated light stream MLS onto the light sensing device 130.
Figure 5A:
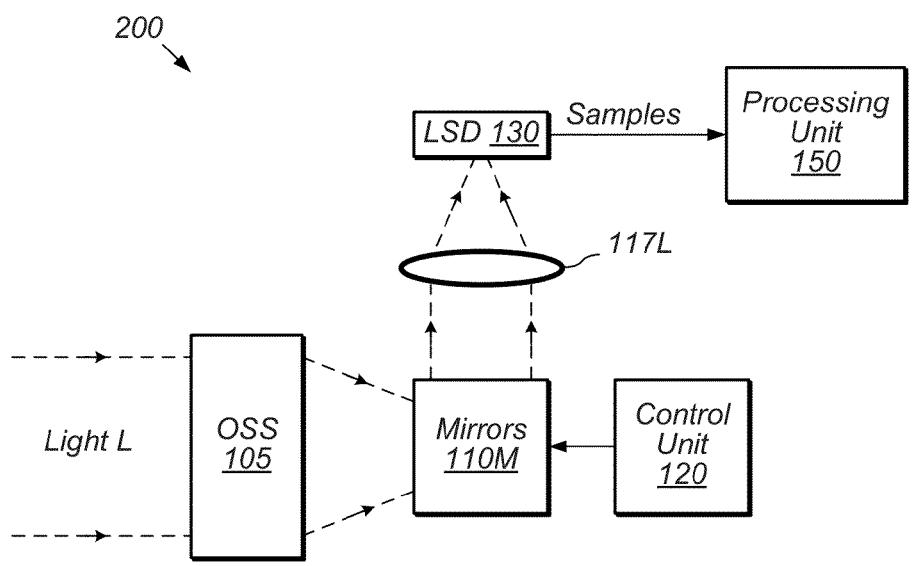
FIG. 5A shows an embodiment of system 200 where the optical subsystem 117 is realized by the lens 117L.

In some embodiments, system realization 200 may include the optical subsystem 117 along the sensing path as shown in FIG. 4. The optical subsystem 117 receives the light portions reflected onto the sensing path 115 and directs (e.g., focuses or concentrates) the received light portions onto a light sensing surface (or surfaces) of the light sensing device 130. In one embodiment, the optical subsystem 117 may include a lens 117L, e.g., as shown in FIG. 5A.

Figure 5B:
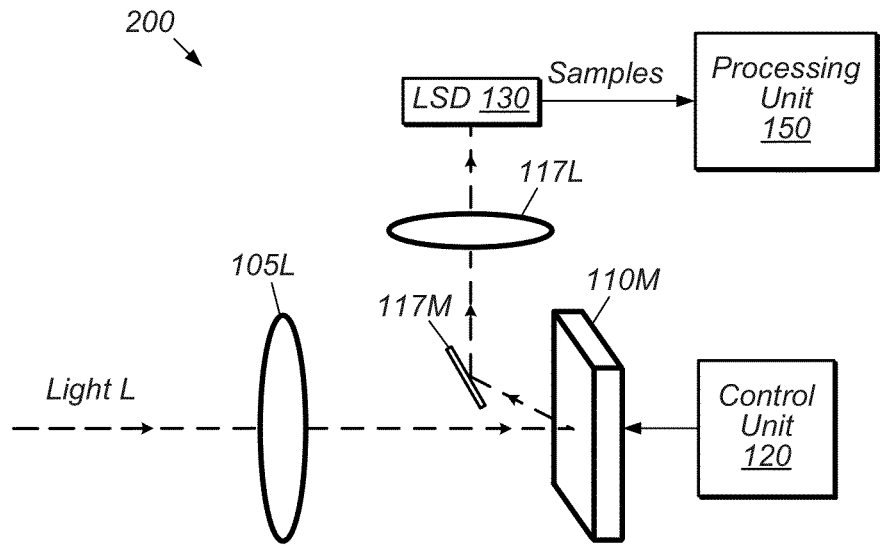
FIG. 5B shows an embodiment of system 200 where the optical subsystem 117 is realized by a mirror 117M and lens 117L in series.

In some embodiments, the optical subsystem 117 may include one or more mirrors, e.g., a mirror 117M as shown in FIG. 5B. Thus, the sensing path may be a bent path having more than one segment. FIG. 5B also shows one possible embodiment of optical subsystem 105, as a lens 105L.

Figure 5C:
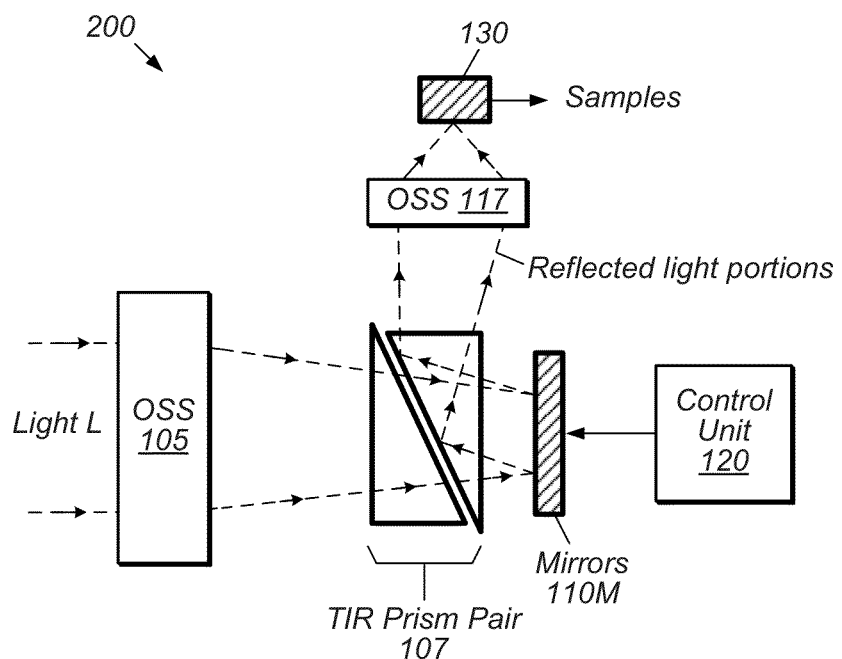
FIG. 5C shows another embodiment of system 200 that includes a TIR prism pair 107.

In some embodiments, there may be one or more optical elements intervening between the optical subsystem 105 and the mirrors 110M. For example, as shown in FIG. 5C, a TIR prism pair 107 may be positioned between the optical subsystem 105 and the mirrors 110M. (TIR is an acronym for "total internal reflection".) Light from optical subsystem 105 is transmitted through the TIR prism pair and then interacts with the mirrors 110M. After having interacted with the mirrors 110M, light portions from mirrors in the first orientation state are reflected by a second prism of the pair onto the sensing path 115. Light portions from mirrors in the second orientation state may be reflected away from the sensing path.

While many of the embodiments described herein involve the modulation of light signals, it should be understood that the principles of the present invention are not limited to light signals. Various embodiments are contemplated where the signals being processed are, e.g., electromagnetic signals or particle beams or seismic signals or acoustic signals or chemical signals or thermal signals or surface waves on a boundary between two fluids or gravitational waves. In each case, a space-time signal is directed to an array of signal-modulating elements whose transmittances or reflectances are individually varied so as to modulate the space-time signal with a time sequence of spatial patterns. The modulated space-time signal may be sensed by a transducer to generate an electrical signal that represents intensity of the modulated space-time signal as a function of time. The electrical signal is sampled to obtain measurements. The measurements may be processed as variously described above to reconstruct an image or sequence of images carried by the original space-time signal.

While many of the embodiments described herein involve the modulation of space-time signals, it should be understood that the principles of the present invention may be applied to signals that are modeled as a real-valued or complex-valued function of time f(t). Signal modulation may be achieved by applying a sequence $\{P_j\}$ of one-dimensional patterns to the signal f(t) to obtain a corresponding sequence $\{S_j\}$ of measurements (inner products). For example, the application of each pattern $P_j$ to the signal f(t) may be modeled by the expression $$S_j = \Sigma_{k=1}^{N} f(t_k) P_j(k).$$

Efficient Generation of Signal Sensing-Matrix Vectors and Efficient Transform for Signal Reconstruction Several mathematical and algorithmic aspects of Hadamard implementations are presented below. Some of these aspects are similar to other unitary operations such as the discrete Fourier transform (DFT). Some of the findings are irrespective of the Hadamard transform, yet we choose to illustrate their efficacy with a Hadamard transform. Some of these findings are general, but we choose to illustrate them by implementation with a digital micromirror device (DMD).

1. Random Diagonal
2. Fast, Non-Power-of-Two Hadamard Pattern Generator.
3. Fast, Non-Power-of-Two Hadamard Transforms.

Random Diagonal

Abstract: A method for introducing randomness/incoherence into a sensing matrix is presented. The result is that it is easier and faster to both: (i) quickly generate the rows of a sensing matrix "on the fly" for taking measurements (e.g., mirror patterns on a DMD) in the data collection phase, and (ii) obtain a matrix-vector multiplication of the sensing matrix with an estimated signal/scene of interest in the reconstruction phase. Both of these improvements are appropriate for many hardware platforms, such as an FPGA.

Background

The canonical mathematical model for a compressive sensing (CS) scenario is $$y = Ax + e, \quad (1)$$

where the measurements y are contained in a length-M column vector, A is the sensing or measurement matrix of size M×N with M≤N, x is a length-N column vector representing the signal/image being observed, and e is length-M column vector that represents noise. A fundamental requirement of CS is that the matrix A must possess some incoherence property with respect to some basis under which the signal is assumed to be sparse or compressible.

Once the measurements y are obtained, an algorithm is used to computationally reconstruct an approximation x* of the signal/image x. For example x* can be found by optimizing an objective function $$x^* = \operatorname{argmin}_{\hat{x}}[g(\hat{x}) + f(\hat{x}, y)]. \quad (2)$$

For example, in the case of Total Variation (TV) minimization we use $$g(\hat{x}) = \|\nabla \hat{x}\|_1 \text{ and} \quad (3A)$$

$$f(\hat{x}, y) = \frac{\lambda}{2} \|A\hat{x} - y\|_2^2. \quad (3B)$$

where $\|\nabla \hat{x}\|_1$ is a measure of the gradient field of $\hat{x}$, $\|A\hat{x}-y\|_2^2$ is the energy of the residual or a measure of the fidelity of how well $A\hat{x}$ approximates the measured data y, and λ is a parameter that balances the importance of the two terms.

Incoherence in the sensing matrix may be achieved by injecting, or imposing some form of randomness. For instance, the entries of A are sometimes drawn from a random distribution, such as a Gaussian distribution or Bernoulli distribution. However, such pure randomness is very expensive to implement in hardware. Instead, many CS systems use a structured matrix (e.g., a DFT matrix, or Hadamard matrix) that is then perturbed in some pseudo-random way.

For example, consider an N×N Hadamard matrix H, which is well known to be an orthogonal transform. However, we are only interested in utilizing M of its rows, which we imagine obtaining with R, the M×N row selector matrix. Since the Hadamard matrix is extremely structured, a common technique to randomize it is to perform a random reordering of its columns using P, an N×N permutation matrix. In this case, we can model our sensing matrix as $$A = RHP. \quad (4)$$

For i=0, 1, 2, . . . , M−1, the ith row of the matrix R is populated with zero values, except for a single one value at column position $$m_i \in \{0, 1, \ldots, N-1\}.$$

Thus, the ith row of the matrix R selects the $m_i$-th row of H. The column positions $m_0, m_1, m_2, \ldots, m_{M-1}$ are preferably distinct values. For example, the column positions $m_0, m_1, m_2, \ldots, m_{M-1}$ may be ordered so that $$0 \leq m_0 < m_1 < m_2 < \ldots < m_{M-1} \leq N-1.$$

Motivation: The Data Collection Phase

We use the selected rows of the matrix H as the patterns that we apply to a signal modulating device such as a digital micromirror device (DMD), to measure a scene of interest represented by the vector x. For simplicity, assume that the entries of H are binary values, such as $\{+1, -1\}$, although this is not strictly required. Common examples of H that are used in CS are Hadamard matrices and Noiselet matrices. (These matrices are sometimes defined with a normalization factor $1/\sqrt{N}$ that makes them unitary. Without loss of generality we ignore this factor, which permits us to assume that the entries are $\{+1, -1\}$, rather than $\{+1/\sqrt{N}, -1/\sqrt{N}\}$. The ignored factor of $1/\sqrt{N}$ can be incorporated into a later step of processing.) The DMD displays one row of H at a time. Each row is reshaped from a 1-D vector to a 2-D array to agree with the size and shape of the DMD, and some of the elements might be discarded if the number of DMD mirrors is fewer than N.

Without loss of generality, we can ignore the row selector R above by assuming that we already have a list of the row indices that we are interested in. For example, in one embodiment this list of indices is pseudo-randomly generated by a linear feedback shift register (LFSR). Therefore, the random mirror patterns may be generated as follows.

Algorithm for Generating Random Measurement Patterns
1. Obtain the ith row index, denoted $m_i$.
2. Generate the $m_i$th row, $h_{m_i}$, of matrix H.
3. Invoke incoherence/randomness in vector $h_{m_i}$ to obtain a resulting vector.
4. Reshape the resulting vector and load it onto the DMD.

The DMD then applies the loaded vector to the incident light field to obtain a modulated light field. A light sensing device such as a photodiode captures a measurement $y_i$ of the intensity of the modulated light field. The vector y represents the ordered collection of measurements $y_0, y_1, \ldots y_{M-1}$.

Based on Equation (4), we inject randomness in Step 3 by permuting the entries of vector $h_{m_i}$. However, randomly permuting a vector is not a trivial task for all hardware platforms, especially when vector length N is large, when there are limited memory resources, and when the permutation must be executed very quickly. An example of a hardware platform on which permutations are difficult to perform is a field-programmable gate array (FPGA).

To overcome this difficulty, we propose a different method of invoking randomness in the measurement matrix A. Let $$A = RHD, \quad (5)$$

where R and H are as before, and D is an N×N diagonal matrix. The elements on the main diagonal of D are random nonzero values. From here on we assume that the main diagonal consists of binary values, e.g., values selected from the set $\{+1, -1\}$. The binary values may be chosen uniformly at random:

$$D = \begin{bmatrix} d_0 & 0 & & 0 \\ & d_1 & & \\ 0 & & \ddots & 0 \\ & & & \ddots \\ 0 & & 0 & d_{N-1} \end{bmatrix}, \quad (6)$$

where $d_j \in \{+1, -1\}$. However, it should be understood that other sets of values (e.g., non-binary sets of values) and/or other probability distributions may be employed.

We refer to D as a "random diagonal." An attractive aspect of the random diagonal whose values are $\{+1, -1\}$ is that it is equivalent to its inverse and its transpose (denoted with a superscript "$T$"):

$$D^{-1} = D^T = D.$$

(The relation $D^T = D$ is true of any diagonal matrix. The relation $D^{-1} = D$ relies on the diagonal elements being drawn from the set $\{+1, -1\}$.) Comparing Equations (4) and (5), we see that rather than permuting the columns of matrix H, the effect of D is to negate a randomly-selected subset of the columns of matrix H. (Negating a column of a matrix means negating all of the elements of the column.) In some sense, this breaks up the structure of the rows of H that we use as the sensing waveforms; this provides an intuitive explanation as to how the random diagonal D helps the matrix A achieve a required level of incoherence. (In some embodiments, N is strictly a power of two, e.g., for Sylvester-Walsh-type Hadamard matrices, which contain a harmonic structure referred to as sequency. However, in other embodiments, we use non-power-of-two Hadamard matrices, which do not contain this sequency structure. Nonetheless, Equation (5) empirically still provides a general method for generating an incoherent sensing matrix A.) The resulting sensing patterns are essentially "salt and pepper" binary noise, and are theoretically incoherent with all sparsity bases, including the gradient domain, which is important in CS algorithms that minimize the TV of an image (cf. Equation (2)-(3)). The gradient domain is loosely analogous to the Haar wavelet basis. (See "Stable Image Reconstruction using Total Variation Minimization", Deanna Needell and Rachel Ward, October 2012, downloadable from http://arxiv.org/abs/1202.6429.)

The key though, is that it is much easier to implement multiplying a random diagonal matrix with a vector, than it is to randomly permute a vector. Let $$d = [d_0, d_1, \ldots, d_{N-1}]^T$$

be the main diagonal of D in Equation (6). Denote ".*" as the operation of pointwise (i.e., component-wise) multiplication. Assume that x is also a length-N column vector. Then we have the following equivalence:

$$d \cdot {}^*x = Dx.$$

Implementation Advantage

Using Equation (5) instead of (4) has a major impact in simplifying the implementation of CS theory. This manifests itself in both the sensing phase, by associating the random diagonal D with the sensing waveforms, i.e., the selected rows of H, as well as in reconstruction phase, by associating D with the approximate scene vector x.

1. Sensing Phase

From Equations (1) and (5), we have $y = Ax + e = R(HD)x + e$. Incoherent mirror patterns for the DMD are now easier and faster to generate "on the fly." For Step 3 above, rather than perform a random permutation of row vector $h_{m_i}$, we now only have to perform a pointwise multiplication with d, the main diagonal of matrix D, i.e., $(h_{m_i} \cdot {}^*d^T)$. Moreover, on a hardware device we could represent a mathematical +1 as logical 1 ("on"), and −1 as logical 0 ("off"), which ultimately correspond to the two possible orientation states of an individual mirror on the DMD. With this interpretation, the pointwise multiplication can be implemented as a simple XNOR (XNOR=NOT XOR) binary operation between the (logical) elements of $h_{m_i}$ and d.

Note that the random diagonal vector d is fixed for all rows that are generated in Step 2 of the random mirror pattern generator algorithm above. Thus, d can be stored or generated "on the fly," e.g., by an LFSR pseudo-random bit generating sequence, and the XNOR operation between $h_{m_j}$ and d can be performed on groups of elements in $h_{m_j}$ and respective groups of elements in d, where the groups are of size N', where N' is smaller than N. A hardware device (e.g., an FPGA or ASIC) may be configured to perform the elementary XNOR operations for an entire group in parallel.

For example, if $N=2^{20}$, then it might be advantageous to operate on groups that are only $N'=2^7=128$ elements long. This especially makes sense whenever H can be broken up into smaller-sized chunks, e.g., in the case of a Hadamard matrix. In general, the size N' of the chunks should complement the structure of matrix H, the architecture of the hardware platform, and any other timing/communication issues.

Generating the sensing pattern in small chunks is advantageous because the bus from the pattern generating hardware (FPGA) and DMD is much smaller than the DMD pattern; moreover, limited routing resources in an FPGA or ASIC preclude generating and routing a full pattern. An appropriate chunk size is a function of the pattern frequency P and the clock frequency of the pattern generation hardware, $F_H$. For a given DMD size N the chunk size must be at least $C=N*P/F_H$. For example, given an XGA DMD, a pattern frequency of $32 \times 10^3$ patterns per second and a clock frequency of $200 \times 10^6$ we require the chunk size be no smaller than 126. Selecting the next power of 2 yields a chunk size of 128.

Resource constraints may preclude storing the random diagonal in its entirety. In this case a pseudorandom diagonal may be constructed by use of an LFSR. An LFSR the size of the chunk size C that is incremented one cycle for each chunk requires C registers. However, this case produces a pattern that is highly correlated as the LFSR is only completely flushed after C clock cycles corresponding to the generation of C chunks. A less correlated pattern may be obtained by using a bank of smaller LFSRs and concatenating their output to form a size C vector. In this case, the number of clock cycles to decorrelate the pattern is equal to the size of the smaller LFSRs. An even more decorrelated pattern may be achieved by instantiating two banks of small LFSRs such that each bank is loaded with a different seed. The size C pattern from the first bank of LFSRs is then point wise added to the bit reversed output of the second bank. This results in a pattern that significantly decorrelates in only one clock cycle at a cost of 2C registers.

In some embodiments, a method for modulating a signal to facilitate measurement of the signal may include: generating a row of a sensing matrix, wherein the row includes chunks of size C; for each of the chunks: (a) generating a respective randomizing vector of size C by concatenating the outputs of a bank of two or more LFSRs; (b) pointwise scaling the elements of the chunk by corresponding elements of the randomizing vector to obtain a randomized chunk; supplying the randomized chunk to a signal modulating device to assemble a randomized version of the row in the signal modulating device; modulating the signal with the randomized version of the row to obtain a modulated signal; and acquiring a sample of intensity of the modulated signal.

In some embodiments, a method for modulating a signal to facilitate measurement of the signal may include:

generating a row of a sensing matrix, wherein the row includes chunks of size C;

for each of the chunks: (1) generating a respective randomizing vector of size C by (a) concatenating the outputs of a first bank of LFSRs to form a first vector of size C, (b) concatenating the outputs of a second bank of LFSRs to form a second vector of size C, (c) pointwise combining the first vector and second vector to obtain the randomizing vector; (2) pointwise scaling the elements of the chunk by corresponding elements of the randomizing vector to obtain a randomized chunk; (3) supplying the randomized chunk to a signal modulating device to assemble a randomized version of the row in the signal modulating device;

modulating the signal with the randomized version of the row to obtain a modulated signal; and acquiring a sample of intensity of the modulated signal.

2. Reconstruction Phase:

From Equations (2), (3), and (5), we need to calculate $\hat{y}$, where $$\hat{y} = A\hat{x} = (RHD)\hat{x}.$$

However, we find it advantageous to apply the random diagonal D to the estimate $\hat{x}$ instead of to the matrix H:

$$\hat{y} = A\hat{x} = RH(D\hat{x}).$$

We rely here on the associativity of matrix multiplication:

$$(RHD)\hat{x} = (RH)(D\hat{x}).$$

In practice, the reconstruction algorithm iterates over many versions of estimate $\hat{x}$. Let $\hat{x}_k$ denote the kth version, i.e., the kth approximate image, which is stored and operated on as a length-N vector. For each version $\hat{x}_k$, the reconstruction algorithm must calculate $$\hat{y} = RH(d.*\hat{x}_k)$$

and then $$d.*(H^T R^T \hat{y}),$$

where d is the main diagonal of matrix D. Recall that since R is an M×N matrix, then $\hat{y}$, is a column vector of length M, and $R^T$ is therefore an N×M matrix. Note that $H^T$ is an N×N matrix, so it is necessary for this "pullback transform" to contain to the factor $R^T$. In essence, the effect of multiplying $R^T$ with $\hat{y}$ is to transform (or "grow") $\hat{y}$ from a column vector of length M to one of length N, while at the same time inserting the M values of $\hat{y}$ into the correct rows corresponding to the rows originally chosen by R.

As in the sensing phase described above, the random diagonal vector d is fixed for all vectors that it is multiplied with, and thus can be stored (or generated on the fly). However, now the random diagonal acts on vectors with real values, as opposed to just binary values. For the first step, assume that the entries of vector $\hat{x}_k$ have been quantized to $\mathcal{B}$ bits and that the most significant bit (MSB) denotes the sign bit. Then the result of $(d.*\hat{x}_k)$ is that the MSBs of the N elements of $\hat{x}_k$ either stay the same or flip depending on the corresponding elements of d. In particular, for an FPGA-implementation, a possible technique to achieve this is a simple pass-through MSB-complement operation on $\hat{x}_k$, where the complement operation is based on the stored vector d. A similar process would be carried out for the next step $d.*(H^T R^T \hat{y})$.

Note that it may be difficult or problematic to associate d with H during reconstruction since it would likely disrupt the ability to perform a fast transform implementation of the resulting matrix HD, and similarly for its transpose: $(HD)^T = D^T H^T = DH^T$. Hence the discussion of the previous paragraph effectively separates the fast transform implementation of H and HT from the fast implementation of randomization step of D.

Fast Hadamard Pattern Generator

Abstract: Two methods of generating rows of a Hadamard matrix of size N "on the fly" are presented. These methods work when N is a power-of-two as well when N is not a power-of-two. In particular, in the non-power-of-two case, a method of dividing integers by three in fixed-point arithmetic is also presented. This method is easily extended to the case of dividing by other prime factors p in fixed-point arithmetic.

Background

Given two arbitrary Hadamard matrices $H_B$ and $H_F$ of size B×B and F×F, respectively, it is well known that their Kronecker product $$H_F \otimes H_B$$

results in another Hadamard matrix of size BF×BF. This form of the Kronecker product means that all of the +1s in $H_F$ are replaced $+H_B$, and all of the −1s are replaced with $-H_B$. (Without loss of generality, we assume that the entries of $H_B$ and $H_{2K}$ are $\{+1,-1\}$ and ignore their respective normalization factors of $1/\sqrt{B}$ and $1/\sqrt{F}$. The combined ignored factor of $1/\sqrt{N}$ can be incorporated into a later step of processing.) This is shown in Equation (7) with $F=2^K$, for some integer $K\geq 0$.

We want to display Hadamard patterns on a modulating device, such as a DMD. We are interested in a fast method of generating arbitrary rows of an N×N, non-power-of-two Hadamard matrix $H_N$, where $N=B\cdot F$. Here, B may have a prime factor other than 2, and $F=2^K$. For example if $N=12\cdot 2^{16}$, then for some integer $0 \leq L \leq 16$, since Hadamard matrices $H_B$ and $H_F$ are known to exist for $B=12\cdot 2^L$ and $F=2^{16-L}$, we have $H_{12\cdot 2^{16}} = H_{2^{16-L}} \otimes H_{12\cdot 2^L}$. In general, B may contain arbitrarily many factors of 2, and we have $$H_N = H_{2^K} \otimes H_B, \qquad (7)$$

or $$H_N = \begin{bmatrix} +H_B & +H_B & +H_B & +H_B & +H_B & +H_B & \cdots & +H_B \\ +H_B & -H_B & +H_b & -H_B & +H_B & -H_B & \cdots & -H_B \\ +H_B & +H_B & -H_B & -H_B & +H_B & +H_B & \cdots & -H_B \\ +H_B & -H_B & -H_B & +H_B & +H_B & -H_B & \cdots & +H_B \\ +H_B & +H_B & +H_B & +H_B & -H_B & -H_B & \cdots & -H_B \\ +H_B & -H_B & +H_B & -H_B & -H_B & +H_B & \cdots & +H_B \\ \vdots & \vdots & \vdots & \vdots & \vdots & \vdots & \ddots & \vdots \\ +H_B & -H_B & -H_B & +H_B & -H_B & +H_B & \cdots & \ddots \end{bmatrix} = \begin{bmatrix} \mathcal{B}_0 \\ \mathcal{B}_1 \\ \mathcal{B}_2 \\ \mathcal{B}_3 \\ \mathcal{B}_4 \\ \mathcal{B}_5 \\ \vdots \\ \mathcal{B}_{2^K-1} \end{bmatrix}.$$

For large N it is impractical to store/read the full N×N matrix to/from memory. Instead, we generate the rows of the matrix "on the fly" (each generated row is used to form a pattern that is displayed on the DMD surface). Note that every block of B rows consists of $2^K$ copies of $H_B$ that are repeated column-wise with some polarity pattern; there are $2^K$ of these B×N row-blocks (i.e., the submatrices) $\mathcal{B}_l$. Clearly, the polarity pattern is inherited from the rows of the $H_{2^K}$ matrix. It is helpful to think of $H_B$ as a "kernel" B×B matrix, and of its individual rows as the "seeds" that are groomed into the larger, structured and multiscale $H_N$ by means of $H_{2^K}$. Therefore, given a row index $m_i$ of $H_N$, we can envision how to generate the $m_i^{th}$ row, $h_{m_i}$:

From $H_B$, one of its B rows is extracted as a length-B "seed." Then $2^K$ copies of this seed are concatenated, with the appropriate polarities, to generate the full row of length-$(B\cdot 2^K)$.

Therefore given row index $m_i$, we need to determine two things: (a) Which row k of the kernel $H_B$ will act as the seed? (b) For what value of l (i.e., which row-block $\mathcal{B}_l$) does row $m_i$ fall into, to act as the polarity pattern?

For example, in the case of the XGA-format DMD, which is of size 768×1024, there are $N=12\cdot 2^{16}$ mirrors. Therefore, any row from a Hadamard $H_{12\cdot 2^{16}}$ matrix can be reshaped to perfectly fit onto an XGA DMD. Now suppose $B=12\cdot 2^3=96$, and we are interested in loading the row corresponding to $m_i=305$ (we assume zero-based indexing, so this is really the three-hundred-sixth row). Since B=96, we see that $m_i=305=(17+3\cdot 96)$ is generated by k=17 (i.e., the eighteenth row) of $H_{96}$, and falls into l=3 (i.e., the fourth) block $\mathcal{B}_3$.

In general, the steps to generate random Hadamard patterns (e.g., mirror patterns) are:

(1) Obtain a coded bit sequence, which identifies a specific row index $m_i$.

(2) Generate the $m_i^{th}$ row $h_{m_i}$ of Hadamard matrix $H_N$:

(3) Invoke incoherence/randomness in vector $h_{m_i}$ to obtain a resulting vector.

(4) Reshape the resulting vector and load it onto the DMD.

We explain two methods below that address Step (2).

Method 1

Suppose that a linear feedback shift register (LFSR) supplies a valid pseudo-random bit sequence in Step 1 for row index $m_i$. (For the case of $N=12\cdot 2^{16}$ we need 20 bits to represent all possible row indices. However, a 20-bit code actually encodes $2^{20}$ possible integers, which is greater than N, so only some of these bit sequences are valid for our scenario. That is, there are $2^{20}-12\cdot 2^{16}=4\cdot 2^{16}$ invalid 20-bit sequences that we assume are somehow filtered out.) This bit sequence can be interpreted as a typical base-2 number where each bit is a place holder for a power of two. (Thus, a "valid" 20-bit binary sequence here means that its decimal value is in the range 0 through $12\cdot 2^{16}-1$, rather than 0 through $2^{20}-1$.) For Step 2, we may use the value of row index $m_i$ in the following way:

The kernel row $k=0, 1, \ldots, B-1$ is calculated as $k=m_i \bmod B$.

The lth block $\mathcal{B}_l$ is calculated as $l=\text{floor}(m_i/B)$, where the "floor" function keeps the integer part of the result of $m_i/B$.

When $B=12\cdot 2^L$, both of these calculations involve dividing by three, which is normally not easy to do in an FPGA. However, arithmetic that is reducible to addition, subtraction, negation and bit shifting can be implemented in an FPGA with minimal cost compared to arithmetic that requires general purpose multiply, divide and power operations. A divide-by-three for a known input range can be implemented with these less inexpensive operations. We are able to divide a number z by three with the approximation $$\frac{z}{3} \approx \sum_{k=1}^{\text{floor}(\log_2(z))} \frac{z\cdot(-1)^{k+1}}{2^k}.$$

This formulation can be implemented by composing the following inexpensive hardware operations:

a. $(-1)^{k+1}$ simply flips the sign bit.
b. Dividing by $2^k$ right-shifts by k bits.
c. $\log_2$ can be fixed for a known input range of z by precomputing the possible values and storing them a lookup table (LUT).
c. Summing over a fixed number of terms is straightforward.

When $B=2^L$ (i.e., when N is a strict power of two), the procedure is straightforward since these calculations involve dividing by powers of two, which is easily accomplished in an FPGA.

Method 2

Assume, for example, that $B=12 \cdot 2^L$ for some integer $0 \le L \le 16$. As before in Step 1, suppose that an LFSR supplies a valid pseudo-random 20-bit binary sequence that represents row index $m_i$. This method, however, is a potentially faster and more streamlined approach. Suppose that L+4 of these bits represent a base-2 number. (Thus, a "valid" 20-bit binary sequence here means that the decimal value of these L+4 bits is in the range 0 through $12 \cdot 2^L - 1$, rather than 0 through $2^{L+4} - 1$. That is, there are $2^{L+4} - 12 \cdot 2^L = 4 \cdot 2^L$ invalid 20-bit sequences that we assume are somehow filtered out.) Then the remaining 16-L bits are interpreted as the base-2 representation of the block number l, which are in the range 0 through $2^{16-L} - 1$. It should be clear that this approach more naturally complements the construction $H_{12 \cdot 2^{16}} = H_{2^{16-L}} \otimes H_{12 \cdot 2^L}$. The sub-steps are:

The kernel row is calculated as k=decimal value of some subset of L+4 bits from the 20-bit sequence.

The lth block $\mathcal{B}_l$ is calculated as l=decimal value of the remaining 16-L bits.

Note: The decimal interpretation of integer i from the bit sequence is now $i = k + l \cdot B$.

Note: Method 2 is easily extended to the general case of $H_N = H_{2^K} \otimes H_B$ for arbitrary B and K. In some embodiments, B may include a prime factor other than two.

In general, for both Methods 1 and 2, it may be advantageous to use as large a value of B as possible (e.g., using $B=12 \cdot 2^L$ rather than just $B=12$). This means that one would initialize using a larger seed row, and thus fewer concatenations would be necessary. Determining the optimal size of B should take into account the structure of matrix $H_N$, the architecture of the hardware platform, and any other timing/communication issues.

Given the kernel row k of $H_B$ and the block row l of $H_F$, we can then form the $m_i$-th row of $H_N$ by properly constructing it from copies of $h_k$ from $H_B$. We present two methods (denoted with Roman numerals, I and II).

Method I:

In this method, the $m_i$-th row of $H_N$ is constructed by concatenating F properly weighted copies of $h_k$. The weight of the jth copy takes the value of the jth element of the lth row of $H_F$.

Method II:

In this method, the $m_i$-th row of $H_N$ is constructed in K concatenation steps. Given the lth row of $H_F$, we know that l must be an integer from the set of $\{0, 1, \ldots, F-1\}$. Now consider its binary representation $l_{bin}$. If $F=2^K$, then $l_{bin}$ contains exactly K bits:

$$l_{bin}[\beta_{K-1}, \beta_{K-2}, \ldots, \beta_2, \beta_1, \beta_0].$$

The sequence of these K bits determines the following K-step method. At each step a temporary vector $h_{temp}$ is generated. The size of this temporary vector is doubled with each step due to the concatenation described below.

---

Pseudocode for Method II

Initialization: The seed row $h_k$ is generated. Set the temporary vector
$h_{temp} = h_k$;
For k = 0 to K − 1
  If $\beta_k = 0$
    Set $h_{temp} = [h_{temp}, h_{temp}]$;

---

Pseudocode for Method II

Else If $\beta_k = 1$
    Set $h_{temp} = [h_{temp}, -h_{temp}]$;
  End If
End For

---

Note that pre-allocating necessary memory resources is important for this method to be viable.

Fast Non-Power-of-Two Hadamard Transforms

Abstract: A method of calculating fast, large, non-power-of-two Hadamard transforms. A method to calculate efficient, small, non-power-of-two Hadamard transforms. Explicit examples are given for the kernel Hadamard $H_{12}$ transform, and the $H_{20}$ transform (two different versions).

Background

For any integer n, and N=4n, it is conjectured that there exists an N×N Hadamard matrix. When N is a power of two, the resulting matrix has desirable mathematical properties, such as being symmetric, i.e., $H_N = H_N^T$. These power-of-two matrices are also attractive since they can be generated recursively, and are often referred to as Sylvester-Hadamard-type matrices. A Walsh-type matrix is the same as the Sylvester-Hadamard except that the rows occur in a different order. (Note the nomenclature in the literature is inconsistent for these types of matrices.)

Most applications that require a Hadamard transform utilize a Sylvester-Hadamard-type (or Walsh-type) construction, since they enable a fast implementation in hardware that takes advantage of the power-of-two, recursive structure. Assume that the signal/image of interest is a vector of size $N=2^K$ for some integer $K \ge 0$. Then similar to how the DFT has a fast Fourier transform (FFT) implementation, there exists a fast Hadamard transform (FHT) that has computational complexity $\mathcal{O}$(N log N), as opposed to $\mathcal{O}$($N^2$).

Given two arbitrary Hadamard matrices $H_B$ and $H_F$ of size B×B and F×F, respectively, it is well known that their Kronecker product $H_{BF} = H_F \otimes H_B$ results in another Hadamard matrix of size BF×BF. The matrix $H_B \otimes H_F$ is also Hadamard, and is just a permuted version of $H_F \otimes H_B$.

Further, the transpose of $H_{BF}$ is also a Hadamard matrix and is simply $H_{BF}^T = H_F^T \otimes H_B^T$. In particular, when $F=2^K$, the Sylvester-Walsh-type Hadamard matrices have the property that $H_F^T = H_F$, and so the transpose of $H_{BF}$ reduces to $H_{BF}^T = H_F \otimes H_B^T$. This means that we can apply all of the following methods described for $H_{BF} = H_F \otimes H_B$ by simply replacing $H_B$ with $H_B^T$.

By definition, the inverse of any orthonormal matrix is its transpose. Hadamard matrices with $\{+1,-1\}$ entries are orthogonal and so $$H_N H_N^T = H_N^T H_N = \frac{1}{N} I.$$

Thus, given an arbitrary Hadamard matrix $H_N$ (and ignoring the overall normalization constant 1/N, which can be accounted for in later stages of processing), we have that $$H_N^{-1} = H_N^T.$$

From this, it should be understood that phrases such as "inverse transform," "transpose transform," "reverse transform," "backward transform," "pullback transform," etc. are meant to refer to the operation associated with the matrix $H_B^{-1}$. When it is necessary, they are used to distinguish between the "forward transform" operation associated with the matrix $H_N$. Further, since the distinction between the forward and backward transformation is sometimes irrelevant (or almost identical) we sometimes just refer to the operation simply as a general Hadamard transform without specifying whether it is in a forward or backward operation. For clarity, we demonstrate the current invention with the forward Hadamard transform, but it should be understood that a similar method can be carried out for the reverse Hadamard transform.

To the best of our knowledge, fast Hadamard transforms for $H_{BF}$ do not currently exist when BF is not a power of two. In the following, we provide details for the forward Hadamard transform associated with the matrix $H_{BF}$, however the same techniques and analysis can be applied to $H_{BF}^T$.

New Idea

Suppose we are interested in a Hadamard transform of size $N=B\cdot2^K$ for some integer $K\geq 0$, where $B=4n$ is not a power of two (e.g., $B=12=4\cdot3$), and where a Hadamard matrix $H_B$ is known to exist. Then we can express $H_N=H_{2^K}\otimes H_B$, which means that we can exploit the power-of-two, recursive component separate from the factor of B component. In this case the computational complexity would be $\mathcal{O}(KN)+\mathcal{O}(2^K H_B)$, where $\mathcal{O}(H_a)$ is the computational complexity to execute one Hadamard transform of size B (see the Analysis sections at the end for examples of the necessary number of operations).

Application and Motivation

In compressive sensing, a signal or image of size N is obtained by making M measurements, where $M\leq N$. The goal is usually to make M as small as possible. For example, in the single-pixel camera, a digital micromirror device (DMD) with N mirrors is used to obtain Hadamard measurements of a scene x. The XGA-format DMD is of size 768×1024, which results in $N=786,432=12\cdot2^{16}$ mirrors. Typical reconstruction algorithms would round up to a power of two by zero padding the signal to length $N=2^{20}$. This can be undesirable since it may require more memory resources to be allocated. This can also be undesirable since it can affect the number of measurements M we must acquire. Collecting more measurements is undesirable since it takes longer, requires more power, and can degrade the quality of a signal or image if it is not static during the observation period. Moreover, a larger transform typically will require more computations, which may be unacceptable. Instead, in this case, we can implement a fast Hadamard transform of size exactly $N=12\cdot2^{16}$ utilizing our new idea explained above by letting $B=12$, since a Hadamard matrix/transform of size 12×12 is known to exist.

Implementation Details

Implementing a non-power-of-two Hadamard transform of a vector x of size $N=B\cdot2^K$ can be accomplished in several different ways. For example, a straightforward implementation would first address the power-of-two component by executing K layers (or levels) of N additions/subtractions using a simple butterfly structure. Then it would be necessary to evaluate the $2^K$ individual $H_B$ transforms. Ideally, these would be performed as much as possible in parallel. This method is essentially a 1-D approach where the transform "sees" the data in a linear layout. Note these operations can also be performed in the reverse order. In other words, the last layer of $H_B$ transforms could occur before the K butterfly layers (possibly followed by an appropriate permutation).

For example, if $N=12\cdot2^3$, then we would start with a 1-D column vector x with 96 values (see the left side of FIG. 1). Then there would be 3 butterfly layers that address the power-of-two component, followed by a fourth layer of $2^3=8$ separate $H_{12}$ transforms. The output of the fourth layer is $H_{96}\cdot x$, the Hadamard transform of x.

Figure 6:
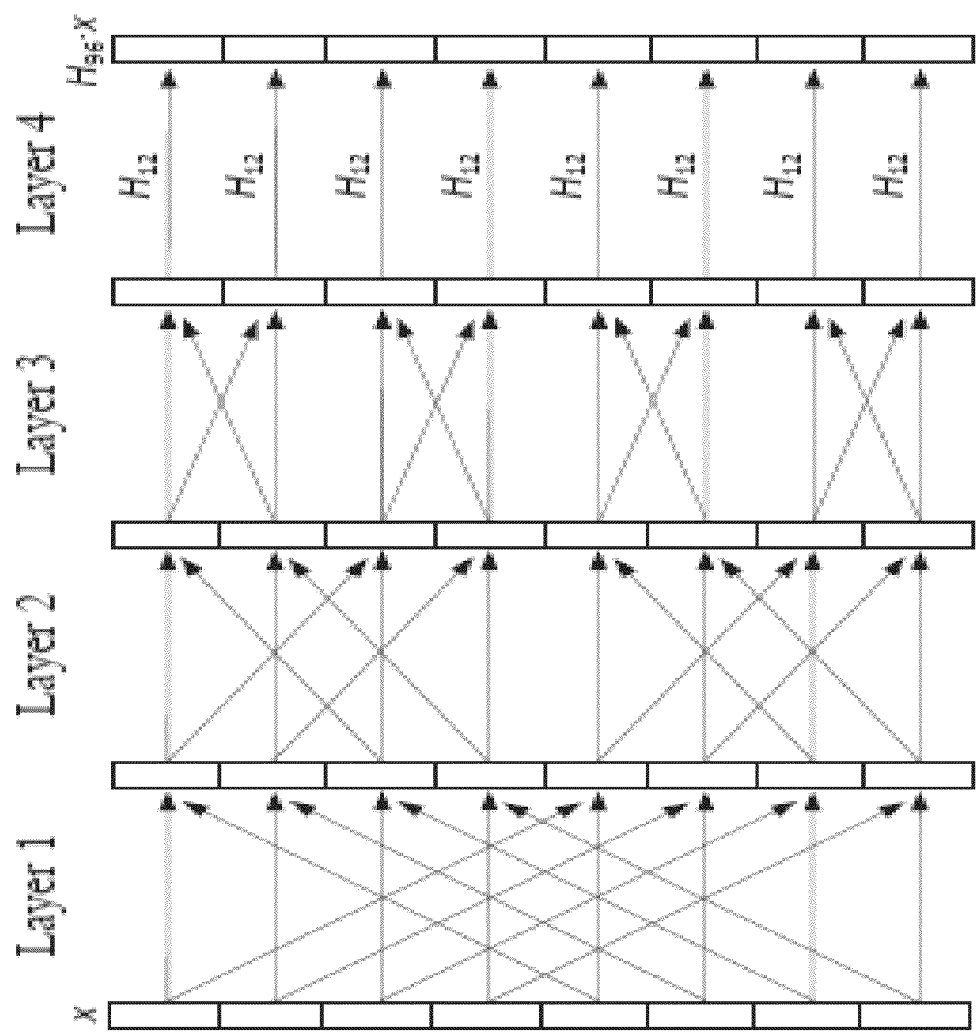
FIG. 6 illustrates one embodiment of a fast Hadamard transform $H_N$ involving a fast Hadamard transform $H_F$ of coarse scale in the first three layers and fast Hadamard transforms $H_B$ at fine scale in the fourth layer.

FIG. 6 is an example of the 1-D linear approach of a Hadamard transform for length N=96. The signal x is on the left. The first three layers are the typical butterfly add/subtract operations. The fourth layer deals with the non-power-of-two component. The result is $H_{96}\cdot x$, the Hadamard transform of x. In general, for a signal of size $N=B\cdot2^K$, there will be K butterfly layers, and one additional layer that implements the non-power-of-two Hadamard transform.

A different approach would view the vector x as a 2-D array. For example, reshaping the data into a $B\times 2^K$ array can reduce the demand on memory resources and the time for data transfer by allowing the transform to be executed "in place." This is especially appropriate for an FPGA implementation. In this 2-D approach seen in FIG. 7, a Hadamard transform of size B can be operated on each of the $2^K$ columns, and a Hadamard transform of size $2^K$ can be operated on each of the B rows. The order of operations may determined by the sense of how the data was reshaped from 1-D to 2-D. Note, for our specific case of $N=12\cdot2^{16}$, the data being transformed was from a 2-D scene of size 768×1024, yet it will be operated on as if it is a signal of size $12\times2^{16}$. In general, for $N=B\cdot2^K$ other 2-D arrangements besides $B\times 2^K$ are possible, too.

Figure 7:
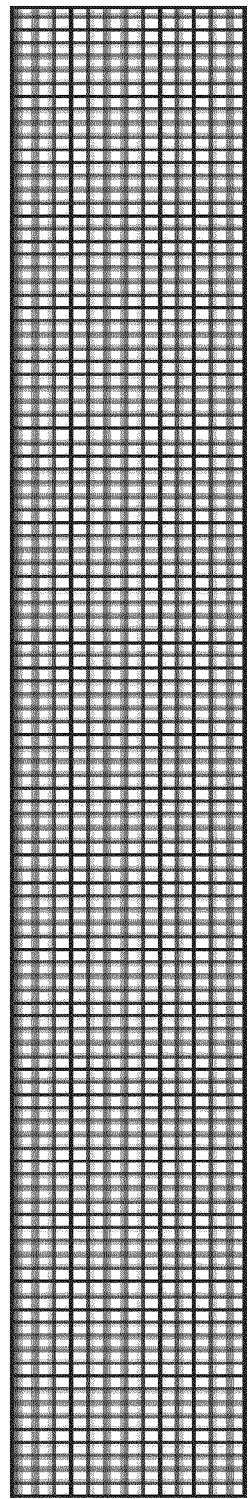
FIG. 7 illustrates the structure of a two-dimensional array storing the N=BF elements of a vector x to be transformed, where the array has B rows and $F=2^k$ columns.

FIG. 7 illustrates a 2-D array approach of a Hadamard transform of length $N=B\cdot2^K$. Here, the signal x is reshaped into a $B\times 2^K$ array, but other 2-D arrangements are possible, too. This permits operating a Hadamard transform of size B on each of the $2^K$ columns, and a Hadamard transform of size $2^K$ on each of the B rows.

This setup is advantageous since we can separate the power-of-two component from the non-power-of-two component. There are well-known and established algorithmic techniques to process Hadamard transforms that are strictly powers-of-two. In the case of FIG. 7, the B rows can be Hadamard transformed very quickly with these well-known approaches. Then all that is left is the unique Hadamard transforms of size B on the columns. The optimal implementation of this is specific to the pattern of $H_B$ and to the hardware platform. Some mathematical and algorithmic details are included in the next section.

Details of the $H_{12}$ Transform

There are different forms of a 12×12 Hadamard transform. We are more interested in the version represented by the following matrix:

$$H_{12} = \begin{bmatrix} +1 & +1 & +1 & +1 & +1 & +1 & +1 & +1 & +1 & +1 & +1 & +1 \\ +1 & -1 & +1 & -1 & +1 & +1 & +1 & -1 & -1 & -1 & +1 & -1 \\ +1 & -1 & -1 & +1 & -1 & +1 & +1 & +1 & -1 & -1 & -1 & +1 \\ +1 & +1 & -1 & -1 & +1 & -1 & +1 & +1 & +1 & -1 & -1 & -1 \\ +1 & -1 & +1 & -1 & -1 & +1 & -1 & +1 & +1 & +1 & -1 & -1 \\ +1 & -1 & -1 & +1 & -1 & -1 & +1 & -1 & +1 & +1 & +1 & -1 \\ +1 & -1 & -1 & -1 & +1 & -1 & -1 & +1 & -1 & +1 & +1 & +1 \\ +1 & +1 & -1 & -1 & -1 & +1 & -1 & -1 & +1 & -1 & +1 & +1 \\ +1 & +1 & +1 & -1 & -1 & -1 & +1 & -1 & -1 & +1 & -1 & +1 \\ +1 & +1 & +1 & +1 & -1 & -1 & -1 & +1 & -1 & -1 & +1 & -1 \\ +1 & -1 & +1 & +1 & +1 & -1 & -1 & -1 & +1 & -1 & -1 & +1 \\ +1 & +1 & -1 & +1 & +1 & +1 & -1 & -1 & -1 & +1 & -1 & -1 \end{bmatrix} \quad (8)$$

An enlarged copy of this matrix is given in FIG. 8.

Recall that Sylvester-Hadamard-type power-of-two matrices $H_{2^K}$ have a recursive, multiscale, harmonic, and symmetric structure. However, the $H_{12}$ matrix in Equation (8) has none of these properties, and similarly for its transpose.

To compute a Hadamard transform of a general vector x of length-12 based on the matrix in Equation (8), we could carry out an explicit matrix-vector multiplication. Another approach is to break up x into four groups of three. (Note, a similar method can be applied to other small Hadamard transforms.) Represent the signal to be transformed as the column vector $$x=[(x_0,x_1,x_2),(x_3,x_4,x_5),(x_6,x_7,x_8),(x_9,x_{10},x_{11})]^T \qquad (9)$$

The parentheses emphasize that we first operate on these subsets of length-3. With this structure, calculate the following sixteen (16) temporary values:
$a=x_0+x_1+x_2$, $b=x_3+x_4+x_5$, $c=x_6+x_7+x_8$, $d=x_9+x_{10}+x_{11}$,
$e=x_0-x_1+x_2$, $f=-x_3+x_4+x_5$, $g=x_6-x_7-x_8$, $h=-x_9+x_{10}-x_{11}$,
$i=x_0-x_1-x_2$, $j=x_3-x_4+x_5$, $k=x_6+x_7-x_8$, $l=x_9+x_{10}-x_{11}$,
$m=x_0+x_1-x_2$, $n=-x_3-x_4+x_5$, $o=x_6-x_7+x_8$, $p=x_9-x_{10}-x_{11}$.

Then combine four (4) of these temporary values for each of the transform coefficients as shown below. Thus, we can express the Hadamard transform coefficients of the column vector $y=H_{12}\cdot x$ with $$y=[y_0,y_1,y_2,y_3,y_4,y_5,y_6,y_7,y_8,y_9,y_{10},y_{11}]^T$$

as
$y_0=a+b+c+d$, $y_1=e+f+g+h$, $y_2=i+j+k+l$, $y_3=m-j+c-d$,
$y_4=e+n-g+p$, $y_5=i-f+o-l$, $y_6=i-j-o+d$, $y_7=m+n-k-p$,
$y_8=a-b+g-h$, $y_9=a-f-o+h$, $y_{10}=e-n-k+l$, $y_{11}=m+b-c+p-$

Analysis

Computing each of the temporary values a, b, . . . , p require just 2 adds, so all sixteen take 16·2=32 adds. Each coefficient of y uses exactly four of these, so there are only 3 adds per coefficient. Therefore, the twelve coefficients of y require 12·3=36 adds. Together, this method requires a total of 32+36=68 adds to compute the Hadamard transform $y=H_{12}\cdot x$. In contrast, an explicit computation of the matrix-vector multiplication (of Equation (8) and (9)) would require 12·11=132 adds. Therefore, this method has the potential to provide an almost a 50% computational savings per $H_{12}$ transform.

(In this analysis the operation of negation was ignored. However, there are 18+16=34 negations in this method vs. 66 negations in the explicit matrix-vector multiplication method.)

A similar grouping and computing approach can be performed for the transposed matrix $H_{12}^T$. The resulting analysis of its computational requirements and savings would be similar as well.

Details of the $H_{20}$ Transform

Figure 9:
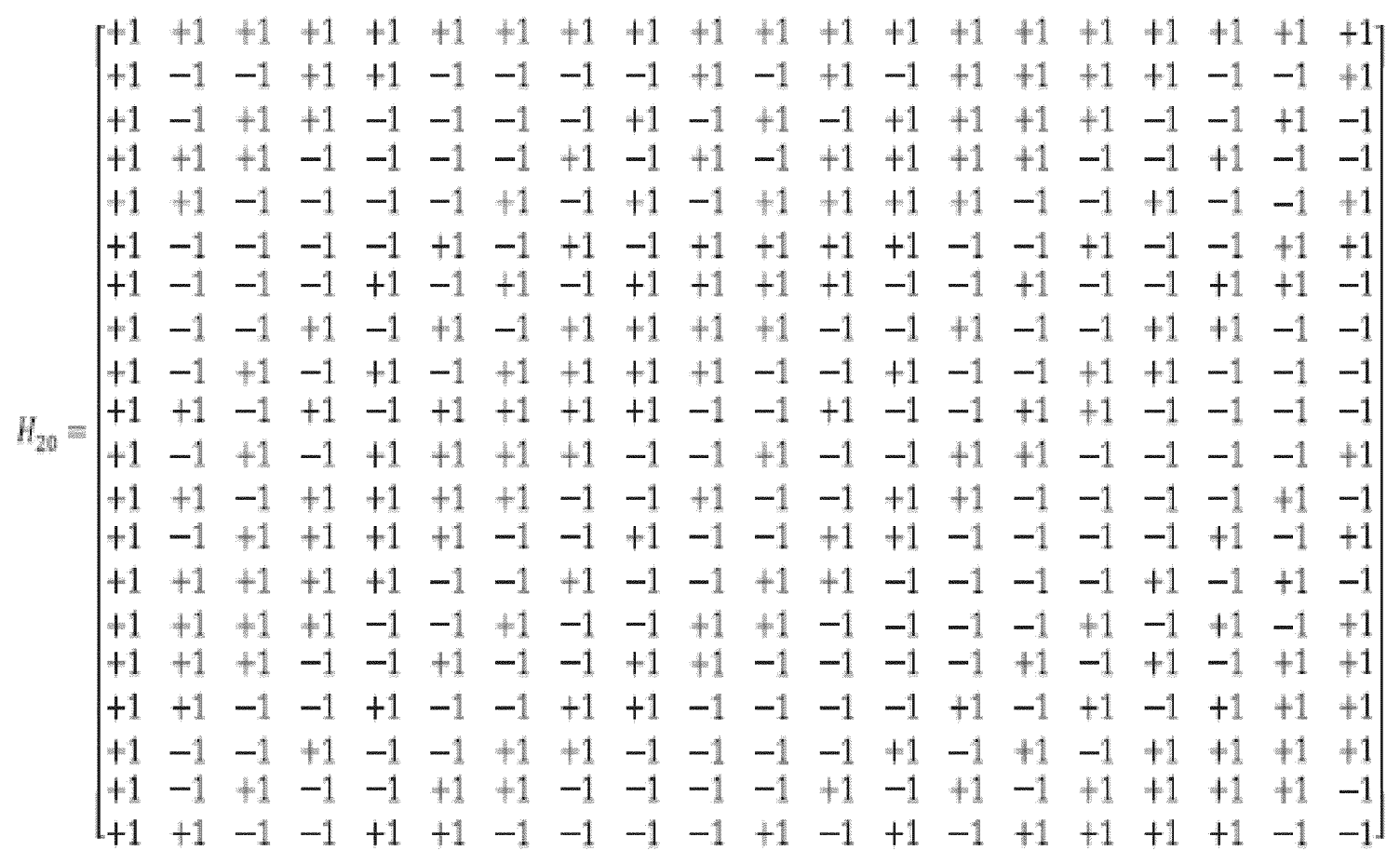

Suppose instead that we are interested in the scenario where B=20. There are different forms of a 20×20 Hadamard transform. We are more interested in the version represented by the $H_{20}$ matrix shown in FIG. 9. To compute an $H_{20}$ Hadamard transform of a general vector x of length-20 based on this matrix we could carry out an explicit matrix-vector multiplication. However, similar to the $H_{12}$ transform described above, we can break up the vector x into small groups of temporary variables and then combine them into the desired transform coefficients. Represent the signal to be transformed as the column vector $$x=[(x_0,x_1,x_2),(x_3,x_4,x_5),(x_6,x_7,x_8),(x_9,x_{10},x_{11}),(x_{12},x_{13}),(x_{14},x_{15}),(x_{16},x_{17}),(x_{18},x_{19})]^T.$$

The parentheses emphasize that we first operate on these subsets of length-2. With this structure, calculate the following twenty (20) temporary values:
$a=x_0+x_1$, $b=x_2+x_3$, $c=x_4+x_5$, $d=x_6+x_7$, $e=x_8+x_9$,
$f=x_{10}+x_{11}$, $g=x_{12}+x_{13}$, $h=x_{14}+x_{15}$, $i=x_{16}+x_{17}$, $j=x_{18}+x_{19}$,
$k=x_0-x_1$, $l=x_2-x_3$, $m=x_4-x_5$, $n=x_6-x_7$, $o=x_8-x_9$,
$p=x_{10}-x_{11}$, $q=x_{12}-x_{13}$, $r=x_{14}-x_{15}$, $s=x_{16}-x_{17}$, $t=x_{18}-x_{19}$.

Then combine ten (10) of these temporary values for each of the transform coefficients as shown below. Thus, we can express the Hadamard transform coefficients of the column vector $y=H_{20}\cdot x$ with $$y=[y_0,y_1,y_2,y_3,y_4,y_5,y_6,y_7,y_8,y_9,y_{10},y_{11},y_{12},y_{13},y_{14},y_{15},y_{16},y_{17},y_{18},y_{19}]^T.$$

as
$y_0=a+b+c+d+e+f+g+h+i+j$, $y_1=k-l+m-d-o-p-q+h+s-t$,
$y_2=k+b-c-d+o+p+g+h-i+t$, $y_3=a+l-c-n-o-p+g+r-s-j$,
$y_4=a-b-c+n+o+f+g-h+s-t$, $y_5=k-b-m-n-o+f+q-r-i+j$,
$y_6=k-b+m+n+e+f-g+r-s+t$, $y_7=k-l-m-n+e+p-q-h-i-j$,
$y_8=k+l+m+d+e-f+q-r+s-j$, $y_9=a-l-m+d+o-p-g+h-i-j$,
$y_{10}=k+l+c+d-e+p+q+r-i-t$, $y_{11}=a-l+c+n-o-f+g-h-i+t$,
$y_{12}=k+b+c-d+o-p+q-h-s-t$, $y_{13}=a+b+m-n-e+f-g-h+s+t$,
$y_{14}=a+b-c+n-o+p-g-r-s-t$, $y_{15}=a+l-m-d+e-f-g+r+s+j$,
$y_{16}=a-b+m-n+o-f-q-r-s+j$, $y_{17}=k-l-c+d-e-f+q+r+i+j$,
$y_{18}=k+l-m+n-e-p-q-r+i+t$, $y_{19}=a-b+c-d-e+p+q+h+i-j$.

Analysis

Computing each of the temporary values a, b, . . . , t require just 1 add, so all twenty take 20·1=20 adds. Each coefficient of y uses exactly ten of these, so there are only 9 adds per coefficient. Therefore, the twenty coefficients of y require 20·9=180 adds. Together, this method requires a total of 20+180=200 adds to compute the Hadamard transform $y=H_{20}\cdot x$. In contrast, an explicit computation of the matrix-vector multiplication would require 20·19=380 adds. Therefore, this method has the potential to provide an almost a 50% computational savings per $H_{20}$ transform.

A similar grouping and computing approach can be performed for the transposed matrix $H_{20}^T$. The analysis of its computational requirements and savings would be similar as well.

Nonsymmetrical Partition of Vector x

Another approach to the $H_{20}$ transform is to view the input vector as $$x=[(x_0,x_1,x_2),(x_3,x_4,x_5),(x_6,x_7,x_8),(x_9,x_{10},x_{11}),(x_{12},x_{13},x_{14}),(x_{15},x_{16},x_{17}),(x_{18},x_{19})]^T,$$

where the first eighteen values are partitioned into six groups of three, and the last two values are in the last, seventh group. With this structure, calculate the following twenty-six (26) temporary values (note there are twenty-four (24) groups of three, and two (2) groups of two):
$a=x_0+x_1+x_2$, $b=x_3+x_4+x_5$, $c=x_6+x_7+x_8$,
$d=x_9+x_{10}+x_{11}$, $e=x_{12}+x_{13}+x_{14}$, $f=x_{15}+x_{16}+x_{17}$,
$g=x_0-x_1-x_2$, $h=x_3+x_4-x_5$, $i=-x_6-x_7+x_8$,
$j=x_9-x_{10}+x_{11}$, $k=-x_{12}+x_{13}+x_{14}$, $l=x_{15}+x_{16}-x_{17}$,
$m=-x_0-x_1+x_2$, $n=x_3-x_4-x_5$, $o=-x_6+x_7-x_8$,
$p=-x_9+x_{10}+x_{11}$, $q=x_{12}+x_{13}-x_{14}$, $r=x_{15}-x_{16}-x_{17}$,
$s=x_0+x_1-x_2$, $t=-x_3+x_4-x_5$, $u=-x_6+x_7+x_8$,
$v=x_9+x_{10}-x_{11}$, $w=-x_{12}+x_{13}-x_{14}$, $z=-x_{15}+x_{16}-x_{17}$,
$aa=x_{18}+x_{19}$, $bb=-x_{18}+x_{19}$.

This system of equations is also shown in FIG. 10.

Then combine seven (7) of these temporary values for each of the transform coefficients as shown below. Thus, we can express the Hadamard transform coefficients of the column vector $y=H_{20}\cdot x$ with $$y=[y_0,y_1,y_2,y_3,y_4,y_5,y_6,y_7,y_8,y_9,y_{10},y_{11},y_{12},y_{13},y_{14},y_{15},y_{16},y_{17},y_{18},y_{19}]^T.$$

as
$y_0=a+b+c+d+e+f+aa$, $y_1=g+h-c+j+k+l+bb$,
$y_2=m+n+i-j+e+r-bb$, $y_3=a-b+o+j+e-l-aa$,
$y_4=s-b-o+p+q+z+bb$, $y_5=g-h+o+d-k+r+aa$,
$y_6=g+t-o+d-q-l-bb$, $y_7=g-t+u+v+w-r-aa$,
$y_8=m+t+c-p-k+l-aa$, $y_9=s-t+c-v-q+r-aa$,
$y_{10}=m-n-i-j+k-f+bb$, $y_{11}=s+b-u-p+q-f-bb$, $y_{12}=m+b+i-v-k-l+bb$, $y_{13}=a+h+o+p-e+z-bb$,
$y_{14}=a+n-u+v-e-z+bb$, $y_{15}=a-h+i-p-q+z+aa$,
$y_{16}=s+t+U-d+w-z+aa$, $y_{17}=g+n-i-d-w-r+aa$,
$y_{18}=m-h-u-v+w+f-bb$, $y_{19}=s-n-c-j-w+f-aa$.

Analysis

Computing each of the temporary values a, b, ..., z require 2 adds, so all twenty-four take 24·2=48 adds, and each of the two temporary values aa, bb require just 1 add, which takes 2·1=2 adds. In total, the twenty-six temporary values require just 48+2=50 adds. Then, each coefficient of y uses exactly seven of these, so there are only 6 adds per coefficient. Therefore, the twenty coefficients of y require 20·6=120 adds. Together, this method requires a total of 50+120=170 adds to compute the Hadamard transform $y=H_{20}·x$. As mentioned above, an explicit computation of the matrix-vector multiplication would require 380 adds. Therefore, this method has the potential to provide a significant savings per $H_{20}$ transform.

A similar nonsymmetrical grouping and computing approach can be performed for the transposed matrix $H_{20}^T$. The analysis of its computational requirements and savings would be similar as well.

In one set of embodiments, a method 1100 for reconstructing an image based on compressive sensing measurements of the image may involve the operations shown in FIG. 11. (The method 1100 may also include any subset of the features, elements and embodiments described above.)

At 1105, the compressive sensing measurements of the image are received, e.g., from a compressive sensing device as variously described above.

At 1107, a reconstruction algorithm is executed on the compressive sensing measurements, where the action of executing the reconstruction algorithm includes computing successive estimates of the image using the compressive sensing measurements, and, for each of the successive image estimates, computing a Hadamard transform $H_{BF}$ of the form $H_{BF}=H_F \otimes H_B$. The symbol "$\otimes$" denotes the Kronecker product operator. $H_F$ is a Hadamard transform of size F×F, and $H_B$ is a Hadamard transform of size B×B. The integer value B is preferably not a power of two. In some embodiments, the reconstruction algorithm may be a total variation algorithm that uses the optimization criterion given in equations (2) and (3). However, a wide variety of other optimization criteria may be used. The action of computing the Hadamard transform $H_{BF}$ on the image estimate may include the operations 1110 and 1115 as follows.

At 1110, a fast Hadamard transform of size F may be performed on a vector x representing the image estimate, to obtain an intermediate vector w, wherein the vector x is of size N=FB. (The term "size" here means the number of element in the vector x.) The fast Hadamard transform is based on the F×F matrix $H_F$, i.e., is a fast implementation of multiplying the F×F matrix $H_F$ with a vector of size F. In this case, the fast Hadamard transform operates on a partitioning of the vector x into F subvectors of size B, where the F subvectors are treated as the F atomic inputs to the fast Hadamard transform. Equivalently, the fast Hadamard transform of size F may apply the same signal flow graph to each of the atom subvectors $v_0, v_1, \ldots, v_{F-1}$ where each vector $v_k$ (k=0, 1, ..., F-1) has exactly B elements:

$$v_k=[x(0+kB), x(1+kB), x(2+kB), \ldots, x((B-1)+kB)].$$

At 1115, an output vector z is generated by performing the Hadamard transform $H_B$ on each of F subvectors of the intermediate vector w to obtain corresponding subvectors of a resultant vector. The output vector z represents the Hadamard transform $H_{BF}$ of the image estimate.

In some embodiments, the integer value F is a power of two.

In some embodiments, x may represent a vector in the Hadamard domain and z is the result of the reverse Hadamard transform. In other embodiments, x may represent a vector of an image estimate and z is the result of the forward Hadamard transform. In either case, the method 1100 may also include displaying a visual representation of the output vector z using a display device, or an acoustic representation of the output vector z using a transducer such as a speaker.

In some embodiments, the operation 1110 and/or the operation 1115 may be performed by one or more of the following: (a) one or more processors executing program instructions stored in memory; (b) one or more dedicated digital circuit devices such as ASICs; one or more programmable hardware elements.

In one set of embodiments, a method 1200 for computing a Hadamard transform $H_{BF}$ of the form $H_{BF}=H_F \otimes H_B$ may involve the operations shown in FIG. 12. (The method 1200 may also include any subset of the features, elements and embodiments described above.) $H_F$ is a Hadamard transform of size F×F, and $H_B$ is a Hadamard transform of size B×B. The integer value F is a power of two, and B is not a power of two.

At 1210, a vector x of size FB is stored into memory so that the elements of the vector are organized in memory as a two-dimensional array having B rows and F columns.

At 1215, a Hadamard transform of size B is performed on each of the F columns of the two-dimensional array. The Hadamard transform on each column may be an in-place computation where the result of transforming the vector accessed from the column is written back into the column.

At 1220, a fast Hadamard transform of size F is performed on each of the B rows of the two-dimensional array. (Again, the fast Hadamard transform on each row may be an in-place computation where the result of transforming the vector accessed from the row is written back into the row.) The resultant state of the two-dimensional array after operation 1220 represents the Hadamard transform $H_{BF}$ of the vector x. The BF values stored in the two-dimensional array may then be read out as a vector z from the memory to a destination device. The order in which the elements of z are read out may be consistent with the order in which the elements of x were written into the two-dimensional array.

As noted above, the operations 1215 and 1220 may be performed in place. In alternative embodiments, the operation 1215 and/or the operation 1220 is not in-place. For example, if the operation 1215 is not performed in place, the operation 1215 writes its results into an intermediate two-dimensional array in memory, where the intermediate two-dimensional array has B rows and F columns, and is different from the first two-dimensional array storing the vector x. The operation 1220 would then act on the rows of the intermediate two-dimensional array. If the operation 1220 is likewise not performed in place, the operation 1220 will store its results into a third two-dimensional array in memory.

In some embodiments, the Hadamard transforms of size B and/or the Hadamard transforms of size F are performed by an FPGA.

In some embodiments, x may represent a vector in the Hadamard domain and z is the result of the reverse Hadamard transform. In other embodiments, x may represent a vector of an image estimate and z is the result of the forward Hadamard transform. In either case, the method 1200 may also include displaying a visual representation of the output vector z using a display device, or an acoustic representation of the output vector z using a transducer such as a speaker.

In some embodiments, the method 1200 is performed as part of an execution of an image reconstruction algorithm. The reconstruction algorithm computes an estimate of an image based on compressive sensing measurements of the image. The operations 1210, 1215 and 1220 are performed in order to determine the Hadamard transform $H_{BF}$ of a current estimate of the image. The compressive sensing measurements are acquired by a compressive sensing camera, e.g., as variously described above.

In some embodiments, the method 1200 includes reconstructing an image based on a vector of compressive sensing (CS) measurements of the image by generating successive estimates of the image using the vector of CS measurements, and, for each of the image estimates, performing operations 1210, 1215 and 1220 on a vector representing the image estimate. The action of reconstructing the image may employ any of a wide variety of image reconstruction algorithms known in the field of compressive sensing. In one embodiment, the total variation algorithm is employed.

In some embodiments, the method 1200 includes reconstructing a signal based on a vector of CS measurements of the signal by generating successive estimates of the signal using the vector of CS measurements, and, for each of the signal estimates, performing operations 1210, 1215 and 1220 on a vector representing the signal estimate. The action of reconstructing the signal may employ any of a wide variety of reconstruction algorithms known in the field of compressive sensing.

In some embodiments, the operations 1210, 1215 and 1220 (or any subset thereof) may be performed by one or more of the following: (a) one or more processors executing program instructions stored in memory; (b) one or more dedicated digital circuit devices such as ASICs; (c) one or more programmable hardware elements.

In one set of embodiments, a method 1300 for performing a N×N Hadamard transform, where N is not a power of two, may include the operations shown in FIG. 13. (The method 1300 may also include any subset of the features, elements and embodiment described above.)

At 1310, a vector x having N components is received.

At 1315, the N components of the vector x are partitioned into M distinct subsets of components.

At 1320, intermediate values are computed, where the intermediate values comprise M distinct groups of intermediate values. The intermediate values in each group are determined by computing linear combinations of the components in a respective one of the M distinct subsets. Coefficients of the linear combinations are taken from the set $\{1,-1\}$.

At 1325, N resultant values are computed, where each of the N resultant values is computed as a corresponding linear combination of a corresponding subset of the intermediate values. Coefficients of the linear combinations are from the set $\{1,-1\}$. The resultant values represent the Hadamard transform of the vector x.

In some embodiments, N=20, M=10, each of the M distinct subsets includes two components, and each of the N resultant values is computed from a corresponding subset of 10 of the intermediate values.

In some embodiments, the following conditions hold: N=20; the M distinct subsets include 6 subsets having three components each, and one subset having two components; and each of the N resultant values is computed from a corresponding subset of 7 of the intermediate values.

In some embodiments, the following conditions hold: N=12; M=4; each of the M distinct subsets includes three components; and each of the N resultant values is computed from a corresponding subset of 4 of the intermediate values.

In some embodiments, the operations 1320 and/or 1325 may be performed by one or more of the following: (a) one or more processors executing program instructions stored in memory; (b) one or more dedicated digital circuit devices such as ASICs; (c) one or more programmable hardware elements.

In some embodiments, the action of computing the intermediate values and the action of computing the N resultant values are performed by a programmable hardware element.

In one set of embodiments, a method 1350 for reconstructing an image based on compressive sensing measurements of the image may include the operations shown in FIG. 13B. (The method 1350 may also include any subset of the features, elements and embodiment described above.)

At 1355, the compressive sensing measurements of the image are received, e.g., from a compressive sensing device such as a compressive imaging camera.

At 1360, a reconstruction algorithm is executed on the compressive sensing measurements. The action of executing the reconstruction algorithm includes: computing successive estimates of the image using the compressive sensing measurements, and, for each of the successive image estimates, computing an N×N Hadamard transform on the image estimate, wherein N is not a power of two. The action of computing the N×N Hadamard transform on the image estimate includes operations 1365, 1370 and 1375.

At 1365, the N components of a vector x representing the image estimate are partitioned into M distinct subsets of components.

At 1370, intermediate values are computed, where the intermediate values comprise M distinct groups of intermediate values. The intermediate values in each group are determined by computing linear combinations of the components in a respective one of the M distinct subsets. Coefficients of the linear combinations are taken from the set $\{1,-1\}$.

At 1375, N resultant values are computed, where each of the N resultant values is computed as a corresponding linear combination of a corresponding subset of the intermediate values. Coefficients of the linear combinations are from the set $\{1,-1\}$. The resultant values represent the Hadamard transform of the image estimate (i.e., the vector x).

In one set of embodiments, a method 1400 for facilitating the sensing of a signal may include the operations shown in FIG. 14. (The method 1400 may also include any subset of the features, elements and embodiments described above.)

At 1410, an index $m_i$ is randomly or pseudo-randomly generated in the range $\{0, 1, 2, \ldots, N-1\}$, where the index $m_i$ identifies a row of an N×N matrix Z having the form of a Kronecker product X⊗Y between a matrix X and a matrix Y, where X is an F×F matrix, and Y is a B×B matrix, where N=BF, where B and F are integers greater than one.

At 1415, the method operates on the index $m_i$ to obtain an index k and an index l, where index k identifies a row of the matrix Y, where the index l identifies a row of the matrix X.

At 1420, the $k^{th}$ row of the matrix Y is generated, e.g., according to a known algorithm or formula.

At 1430, the method generates selectively-modified copies of the $k^{th}$ row of the matrix Y, where the selective modification of copies is controlled by respective elements in the $l^{th}$ row of the matrix X. For example, the $j^{th}$ copy, j=0, 1, 2, ..., F−1, may be multiplied by $j^{th}$ element in the $l^{th}$ row of X. (The modification is said to be "selective" because it need not be perform in the case where the $j^{th}$ element is equal to one. When matrix X is a Hadamard matrix, half the elements in the $l^{th}$ row will be equal to one.) The selective-modified copies collectively form the $m_i^{th}$ row of the matrix Z.

At 1435, the selectively-modified copies may be supplied (e.g., transferred) to an array of signal modulating elements to enable the array to modulate the signal with the $m_i^{th}$ row of the matrix Z. If the signal modulating array is a two-dimensional array, the elements of the $m_i^{th}$ row may be wrapped onto the two-dimensional array, e.g., in a row major fashion, or alternatively, a column major fashion.

At 1440, the operations 1410 through 1435 may be repeated a plurality of times.

In some embodiments, the operations 1430 and 1435 may be performed in a parallel and/or pipelined fashion. For example, the current selectively-modified copy of the $k^{th}$ row of the matrix Y may be supplied to the signal modulating array while the next copy is being generated by operation 1430. In one alternative embodiment, all the selectively modified copies of the $k^{th}$ row are assembled in a buffer memory so that the $m_i^{th}$ row of the matrix Z is completely formed before being transferred to the signal modulating array.

In some embodiments, the matrix X is a binary-valued matrix, i.e., a matrix whose elements are drawn from a set consisting of two values.

In some embodiments, X and Y are Hadamard matrices.

In some embodiments, F is a power of two. In other embodiments, F is not a power of two.

In some embodiments, the generation of the index $m_i$ is performed by a linear feedback shift register (LFSR). Successive indices are generated from successive states of the LFSR. In some embodiments, the index generation is performed by a digital subsystem comprising a combination of two or more LFSRs, e.g., one running in a forward direction and another in a backward direction.

In some embodiments, the integer value B includes a prime factor other than two.

In some embodiments, the operations 1410 through 1435 (or any subset thereof) may be performed by one or more of the following: (a) one or more processors executing program instructions stored in memory; (b) one or more dedicated digital circuit devices such as ASICs; (c) one or more programmable hardware elements.

In some embodiments, one or more of the operations 1410 through 1435 (or any subset thereof) are performed in a programmable hardware element.

In some embodiments, array of signal modulating elements is realized by light modulation unit such as a digital micromirror device (DMD).

In some embodiments, the indices k and l may be determined according to the expressions:

$$k = m_i \bmod B \text{ and}$$

$$l = \text{floor}(m_i/B).$$

In some embodiments, the integer value B includes 3 as a prime factor. Thus, the computation of k and/or the computation of l includes a division of an operand z by 3. The division by 3 may include adding successively shifted versions of operand z with alternating sign. This relies on the fact that $\frac{1}{3}$ equals an alternating sum of inverse powers of two, i.e., $$\tfrac{1}{3} = \tfrac{1}{2} - \tfrac{1}{4} + \tfrac{1}{8} - \tfrac{1}{16} + \tfrac{1}{32} - \tfrac{1}{64} + \ldots$$

In some embodiments, the integer value B includes 5 as a prime factor. Thus, the computation of k and/or the computation of l include a division of an operand z by 5. The division by 5 may include adding successively shifted versions of operand z with signs selectively modified according the pattern +, −, −, + which is applied cyclically with respective shift distance. This relies on the fact that $$\tfrac{1}{5} = \tfrac{1}{2} - \tfrac{1}{4} - \tfrac{1}{8} + \tfrac{1}{16} + \tfrac{1}{32} - \tfrac{1}{64} - \tfrac{1}{128} + \tfrac{1}{256} + \ldots$$

Thus, $$z/5 = z/2 - z/4 - z/8 + z/16 + z/32 - z/64 - z/128 + z/256 + \ldots$$

In general, division by any non-dyadic fraction (any fraction whose denominator is not a power of two) may be approximated by a sum of selectively signed and shifted versions of the operand z with a periodic repetition of signs.

In some embodiments, the index $m_i$ is a binary value, the index k is determined by a first subset of bits in the binary value, and the index 1 is determined by a second subset of bits in the binary value.

Additional embodiments are described in the following numbered paragraphs.

1. A method for facilitating the sensing of an input signal (e.g., an image), the method comprising: (a) generating a selected row of a predefined matrix; (b) performing a component-wise multiplication between the selected row and a randomizing vector d to obtain a randomized row; (c) supplying the randomized row to an array of signal modulating elements to enable the array to modulate the input signal based on the randomized row; repeating (a) through (c) a plurality of times using the same randomizing vector d.

2. The method of paragraph 1, wherein each repetition of (c) includes: the array modulating the input signal based on the randomized row to obtain a modulated signal; and a sensing device acquires a measurement of intensity of the modulated signal in response to the modulation of the input signal based on the randomized row.

3. The method of paragraph 2, wherein the array and sensing device are part of a compressed sensing device.

4. The method of paragraph 1, wherein the array of signal modulating elements is realized by a digital micromirror device (DMD), wherein the input signal is an incident light field.

5. The method of paragraph 1, wherein the randomizing vector d is a binary-valued vector (e.g., a vector of ones and minus ones).

6. The method of paragraph 1, wherein (b) is performed in a field-programmable gate array (FPGA).

7. The method of paragraph 1, wherein the predefined matrix is a Hadamard matrix.

8. A method for reconstructing a signal (e.g., an image) based on a vector y of measurements of the signal, the method comprising: performing a sequence of computational iterations to minimize an objective function, wherein the objective function includes a measure of the difference between a vector Ax' and the vector y of measurements, wherein the vector x' represents an estimate of the signal, wherein A is a sensing matrix of the form A=RHD, wherein R is an M×N row selector matrix, wherein H is a matrix used in the acquisition of the measurements comprising vector y, wherein M less than or equal to N, wherein D is a diagonal matrix, wherein the main diagonal entries of D are randomly-selected non-zero values, wherein each of the computational iterations includes the multiplication Dx'(k) of the diagonal matrix D by a current estimate vector x'(k), wherein the multiplication Dx'(k) is implemented as a component-wise multiplication between the current estimate vector x'(k) and a vector d, wherein d is the main diagonal of D.

8B. The method of paragraph 1, wherein the main diagonal entries of D are binary valued (e.g., ones and minus ones).

8C. The method of paragraph 8, wherein the measurements of vector y are acquired using the rows of the sensing matrix A (e.g., by modulating the signal with a temporal sequence of patterns determined by respective rows of the sensing matrix and acquiring samples of the intensity of the modulated signal).

9. The method of paragraph 8, wherein H is a Hadamard matrix.

10. The method of paragraph 8, wherein each computational iteration also includes the component-wise multiplication between the vector d and the vector $H^T R^T RHDx'(k)$.

11. The method of paragraph 8, wherein the method is implemented on a set of one or more processors operating under the control of stored program instructions.

12. A method for facilitating the sensing of a signal (e.g., an image), the method comprising: (a) generating an index $m_i$ identifying a row of a matrix Z having the form of a Kronecker product $X \otimes Y$ between a matrix X and a matrix Y; (b) operating on the index $m_i$ to obtain an index k and an index l, wherein index k identifies a row of the matrix Y, wherein the index l identifies a row of the matrix X; (c) generating the $k^{th}$ row of the matrix Y; (d) generating selectively-modified copies of the $k^{th}$ row of the matrix Y, wherein the selective modification of copies is controlled by respective elements in the $l^{th}$ row of the matrix X; (e) concatenating the selectively-modified copies of the $k^{th}$ row of the matrix Y to obtain the $m_i^{th}$ row of the matrix Z; (f) supplying the $m_i^{th}$ row of the matrix Z to an array of signal modulating elements to enable the array to modulate the signal based on the $m_i^{th}$ row; repeating (a) through (f) a plurality of times.

13. The method of paragraph 12, wherein the matrix X is a binary-valued matrix (e.g., a matrix of ones and minus ones).

14. The method of paragraph 12, wherein X and Y are Hadamard matrices.

15. The method of paragraph 12, wherein X is an F×F matrix, wherein F is a power of two.

16. The method of paragraph 12, wherein X is an F×F matrix, wherein F is not a power of two.

17. The method of paragraph 12, wherein (a) is performed by a linear feedback shift register.

18. The method of paragraph 12, wherein Y is a B×B matrix, wherein B includes a prime factor other than two.

19. The method of paragraph 12, wherein one or more of (a), (b), (c), (d) and (e) are performed in a programmable hardware element (e.g., an FPGA).

20. The method of paragraph 12, wherein the array of signal modulating elements is realized by a digital micromirror device (DMD).

21. The method of paragraph 12, wherein (b) includes computing k and l according to the expressions: k=i mod B and l=floor(i/B), wherein matrix Y is a B×B matrix.

22. The method of paragraph 21, wherein B includes 3 as a prime factor, wherein the computation of k and/or the computation of l includes a division of an operand z by 3, wherein the division by 3 includes adding successively shifted versions of operand z with alternating sign.

23. The method of paragraph 12, wherein the index $m_i$ is a binary value, wherein the index k is determined by a first subset of bits in the binary value, wherein the index l is determined by a second subset of bits in the binary value.

24. A method for computing an efficient Hadamard transform $H_{BF}$ of the form $H_{BF}=H_F \otimes H_B$, wherein $\otimes$ denotes the Kronecker product, wherein $H_F$ is a Hadamard transform of size F×F, wherein $H_B$ is a Hadamard transform of size B×B, wherein B is not a power of two, the method comprising:

performing a fast Hadamard transform of size F on a vector x to obtain an intermediate vector w, wherein the vector x is of size N=FB, wherein the fast Hadamard transform is based on the F×F matrix $H_F$, wherein the fast Hadamard transform operates on a partitioning of the vector x into F subvectors of size B, wherein the F subvectors are treated as the F atomic inputs to the fast Hadamard transform (in contrast to the traditional fast Hadamard transform of size F, which operates on F scalar values as its F atomic inputs); and generating an output vector z by performing the Hadamard transform $H_B$ on each of F subvectors of the intermediate vector w to obtain corresponding subvectors of a resultant vector.

25A. The method of paragraph 24, wherein F is a power of two.

25B. The method of paragraph 24 further comprising: reconstructing an image based on a vector of compressive sensing (CS) measurements of the image by performing operations including a plurality of repetitions of said performing the fast Hadamard transform of size F and said generating the output vector z. The action of reconstructing the image may employ any of wide variety of image reconstruction algorithms known in the field of compressive sensing. In one embodiment, the total variation algorithm is employed.

25C. The method of paragraph 24, further comprising: reconstructing a signal based on a vector of CS measurements of the signal by performing operations including a plurality of repetitions of said performing the fast Hadamard transform of size F and said generating the output vector z. The action of reconstructing the signal may employ any of wide variety of reconstruction algorithms known in the field of compressive sensing.

26. A method for computing a Hadamard transform $H_{BF}$ of the form $H_{BF}=H_F \otimes H_B$, wherein $\otimes$ denotes the Kronecker product, wherein $H_F$ is a Hadamard transform of size F×F, wherein $H_B$ is a Hadamard transform of size B×B, wherein F is a power of two, wherein B is not a power of two, the method comprising: (a) storing a vector x of size FB into memory so that is organized as a two-dimensional array having B rows and F columns; (b) performing a Hadamard transform of size B on each of the F columns; (c) performing a fast Hadamard transform of size F on each of the B rows.

27. The method of paragraph 26, wherein (b) and (c) are performed as in-place computations in memory.

28. The method of paragraph 26, wherein said Hadamard transforms of size B and/or said Hadamard transforms of size F are performed by an FPGA.

29. A method for performing a N×N Hadamard transform, wherein N is not a power of two, the method comprising: receiving a vector x having N components; partitioning the N components of the vector x into M distinct subsets of components; computing intermediate values, wherein the intermediate values comprise M distinct groups of intermediate values, wherein the intermediate values in each group are determined by computing linear combinations of the components in a respective one of the M distinct subsets, wherein coefficients of the linear combinations are from the set {1,-1}; computing N resultant values, wherein each of the N resultant values is computed as a linear combination of a corresponding subset of the intermediate values, wherein coefficients of the linear combination are from the set {1,-1}, wherein the resultant values represent the Hadamard transform of the vector x.

30. The method of paragraph 29, wherein N=20, wherein M=10, wherein each of the M distinct subsets includes two components, wherein each of the N resultant values is computed from a corresponding subset of 10 of the intermediate values.

31. The method of paragraph 29, wherein N=20, wherein the M distinct subsets includes 6 subsets having three components each, and one subset having two components, wherein each of the N resultant values is computed from a corresponding subset of 7 of the intermediate values.

32. The method of paragraph 29, wherein N=12, wherein M=4, wherein each of the M distinct subsets includes three components, wherein each of the N resultant values is computed from a corresponding subset of 4 of the intermediate values.

33. The method of paragraph 29, wherein said computing the intermediate values and said computing the N resultant values are performed by a programmable hardware element (e.g., an FPGA).

Any of the various embodiments described herein may be realized in any of various forms, e.g., as a computer-implemented method, as a computer-readable memory medium, as a computer system, etc. A system may be realized by one or more custom-designed hardware devices such as ASICs, by one or more programmable hardware elements such as FPGAs, by one or more processors executing stored program instructions, or by any combination of the foregoing.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a computer system may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The computer system may be realized in any of various forms. For example, the computer system may be a personal computer (in any of its various realizations), a workstation, a computer on a card, an application-specific computer in a box, a server computer, a client computer, a hand-held device, a mobile device, a wearable computer, a sensing device, an image acquisition device, a video acquisition device, a computer embedded in a living organism, etc. The computer system may include one or more display devices. Any of the various computational results disclosed herein may be displayed via a display device or otherwise presented as output via a user interface device.

Any of the various embodiments described herein may be combined to form composite embodiments. Furthermore, any of the various features, embodiments and elements described in U.S. Provisional Application No. 61/759,003, filed on Jan. 31, 2013 may be combined with any of the various embodiments described herein.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method for reconstructing an image based on compressive sensing measurements of the image, the method comprising:

receiving the compressive sensing measurements of the image;

executing a reconstruction algorithm on the compressive sensing measurements, wherein said executing the reconstruction algorithm includes computing successive estimates of the image using the compressive sensing measurements, and, for each of the successive image estimates, computing a Hadamard transform $H_{BF}$ of the form $H_{BF}=H_F \otimes H_B$ on the image estimate, wherein $\otimes$ denotes the Kronecker product, wherein $H_F$ is a Hadamard transform of size F×F, wherein $H_B$ is a Hadamard transform of size B×B, wherein B is not a power of two, wherein said computing the Hadamard transform $H_{BF}$ on the image estimate is performed by:

performing a fast Hadamard transform of size F on a vector x representing the image estimate, to obtain an intermediate vector w, wherein the vector x is of size N=FB, wherein the fast Hadamard transform is based on the F×F matrix $H_F$, wherein the fast Hadamard transform operates on a partitioning of the vector x into F subvectors of size B, wherein the F subvectors are treated as the F atomic inputs to the fast Hadamard transform;

generating an output vector z by performing the Hadamard transform $H_B$ on each of F subvectors of the intermediate vector w to obtain corresponding subvectors of a resultant vector, wherein the output vector z represents the Hadamard transform $H_{BF}$ of the image estimate.

2. The method of claim 1, wherein F is a power of two.

3. The method of claim 1, further comprising displaying a visual representation of the output vector z.

4. A method for computing a Hadamard transform $H_{BF}$ of the form $H_{BF}=H_F \otimes H_B$, wherein $\otimes$ denotes the Kronecker product, wherein $H_F$ is a Hadamard transform of size F×F, wherein $H_B$ is a Hadamard transform of size B×B, wherein F is a power of two, wherein B is not a power of two, the method comprising:

(a) storing a vector x of size FB into memory so that is organized as a two-dimensional array having B rows and F columns;

(b) performing a Hadamard transform of size B on each of the F columns of the two-dimensional array, wherein the Hadamard transform of size B on each column is performed as an in-place computation;

(c) performing a fast Hadamard transform of size F on each of the B rows of the two-dimensional array, wherein the fast Hadamard transform of size F on each row is performed as an in-place computation.

5. The method of claim 4, wherein the method is performed as part of an execution of an image reconstruction algorithm in order to compute an estimate of an image based on compressive sensing measurements of the image, wherein (a), (b) and (c) are performed in order to determine the Hadamard transform $H_{BF}$ of a current estimate of the image, wherein the compressive sensing measurements are acquired by a compressive sensing camera.

6. The method of claim 4, wherein said Hadamard transforms of size B and/or said Hadamard transforms of size F are performed by an FPGA.

7. A method for reconstructing an image based on compressive sensing measurements of the image, the method comprising:

receiving the compressive sensing measurements of the image;

executing a reconstruction algorithm on the compressive sensing measurements, wherein said executing the reconstruction algorithm includes computing successive estimates of the image using the compressive sensing measurements, and, for each of the successive image estimates, computing an N×N Hadamard transform on the image estimate, wherein N is not a power of two, wherein said computing the N×N Hadamard transform on the image estimate includes:

partitioning the N components of a vector x representing the image estimate into M distinct subsets of components;

computing intermediate values, wherein the intermediate values comprise M distinct groups of intermediate values, wherein the intermediate values in each group are determined by computing linear combinations of the components in a respective one of the M distinct subsets, wherein coefficients of the linear combinations are from the set $\{1,-1\}$;

computing N resultant values, wherein each of the N resultant values is computed as a corresponding linear combination of a corresponding subset of the intermediate values, wherein coefficients of the linear combinations are from the set $\{1,-1\}$, wherein the resultant values represent the Hadamard transform of the image estimate.

8. The method of claim 7, wherein N=20, wherein M=10, wherein each of the M distinct subsets includes two components, wherein each of the N resultant values is computed from a corresponding subset of 10 of the intermediate values.

9. The method of claim 7, wherein N=20, wherein the M distinct subsets includes 6 subsets having three components each, and one subset having two components, wherein each of the N resultant values is computed from a corresponding subset of 7 of the intermediate values.

10. The method of claim 7, wherein N=12, wherein M=4, wherein each of the M distinct subsets includes three components, wherein each of the N resultant values is computed from a corresponding subset of 4 of the intermediate values.

11. The method of claim 7, wherein said computing the intermediate values and said computing the N resultant values are performed by a programmable hardware element.

12. A method for facilitating the sensing of a signal, the method comprising:

(a) randomly or pseudo-randomly generating an index $m_i$ in the range $\{0, 1, 2, \ldots, N-1\}$, wherein the index $m_i$ identifies a row of an N×N matrix Z having the form of a Kronecker product X⊗Y between a matrix X and a matrix Y, wherein X is an F×F matrix, where Y is a B×B matrix, wherein N=BF, wherein B and F are integers greater than one;

(b) operating on the index $m_i$ to obtain an index k and an index l, wherein index k identifies a row of the matrix Y, wherein the index l identifies a row of the matrix X;

(c) generating the $k^{th}$ row of the matrix Y;

(d) generating selectively-modified copies of the $k^{th}$ row of the matrix Y, wherein the selective modification of copies is controlled by respective elements in the $l^{th}$ row of the matrix X, wherein the selectively-modified copies collectively form the $m_i^{th}$ row of the matrix Z;

(e) supplying the selectively-modified copies to an array of signal modulating elements to enable the array to modulate the signal with the $m_i^{th}$ row of the matrix Z;

repeating (a) through (e) a plurality of times.

13. The method of claim 12, wherein the matrix X is a binary-valued matrix.

14. The method of claim 12, wherein X and Y are Hadamard matrices.

15. The method of claim 12, wherein (a) is performed by a linear feedback shift register.

16. The method of claim 12, wherein B includes a prime factor other than two.

17. The method of claim 12, wherein one or more of (a), (b), (c), (d) and (e) are performed in a programmable hardware element.

18. The method of claim 12, wherein the array of signal modulating elements is realized by a digital micromirror device (DMD).

19. The method of claim 12, wherein (b) includes computing k and l according to the expressions:

$k = m_i \bmod B$ and $l = \text{floor}(m_i/B)$.

20. The method of claim 12, wherein B includes p as a prime factor, wherein the computation of k and/or the computation of l includes a division of an operand z by p, wherein the division by p includes adding successively shifted versions of operand z with respective signs conforming to a predefined pattern.

* * * * *